United States Patent
Bian et al.

(12) 
(10) Patent No.: US 12,375,796 B2
(45) Date of Patent: Jul. 29, 2025

(54) AUDIO PROCESSING METHOD AND DEVICE

(71) Applicant: Huawei Technologies Co., Ltd., Shenzhen (CN)

(72) Inventors: Chao Bian, Nanjing (CN); Lu Ge, Shenzhen (CN); Fengxia Kang, Shenzhen (CN); Zeng Zhang, Shenzhen (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 201 days.

(21) Appl. No.: 17/909,557

(22) PCT Filed: Feb. 26, 2021

(86) PCT No.: PCT/CN2021/078268
§ 371 (c)(1),
(2) Date: Sep. 6, 2022

(87) PCT Pub. No.: WO2021/175165
PCT Pub. Date: Sep. 10, 2021

(65) Prior Publication Data
US 2023/0115929 A1    Apr. 13, 2023

(30) Foreign Application Priority Data
Mar. 6, 2020 (CN) .......................... 202010153146.5

(51) Int. Cl.
*H04N 23/63* (2023.01)
*H04N 23/67* (2023.01)
(Continued)

(52) U.S. Cl.
CPC ......... *H04N 23/632* (2023.01); *H04N 23/633* (2023.01); *H04N 23/671* (2023.01); *H04N 23/69* (2023.01); *H04R 5/04* (2013.01)

(58) Field of Classification Search
CPC .. H04N 23/632; H04N 23/633; H04N 23/671; H04N 23/69; H04N 23/62;
(Continued)

(56) References Cited

U.S. PATENT DOCUMENTS

2006/0227224 A1    10/2006  Kawata et al.
2007/0064141 A1*    3/2007  Misawa ................ H04N 23/54
                                            348/E5.045
(Continued)

FOREIGN PATENT DOCUMENTS

CN    105578097 A    5/2016
CN    105657299 A    6/2016
(Continued)

*Primary Examiner* — Abdelaaziz Tissire
(74) *Attorney, Agent, or Firm* — Conley Rose, P.C.

(57) ABSTRACT

An audio processing method implemented by an electronic device includes entering a multi-channel video recording mode, detecting a shooting operation of a user, simultaneously recording, after detecting the shooting operation, a first video image and a second video image using a first camera and a second camera, and recording audio of a plurality of sound channels, where the audio includes panoramic audio, first audio corresponding to the first video image, and second audio corresponding to the second video image. The electronic device further records the first audio based on a feature value such as a zoom magnification corresponding to the first display area.

20 Claims, 28 Drawing Sheets

(51) Int. Cl.
*H04N 23/69* (2023.01)
*H04R 5/04* (2006.01)

(58) Field of Classification Search
CPC .... H04N 23/631; H04N 5/2624; H04N 23/45; H04N 23/667; H04N 23/698; H04N 9/8042; H04N 9/8211; H04N 5/772; H04N 5/76; H04N 5/9155; H04N 5/9202; H04N 5/9265; H04N 23/67; H04N 23/90; G11B 27/105; G11B 27/34; H04R 5/04; H04R 2201/025; H04R 2499/11; H04R 2499/15; H04R 3/005; H04R 1/08; H04R 3/00; H04S 2400/15; H04S 7/302
See application file for complete search history.

(56) References Cited

U.S. PATENT DOCUMENTS

| | | | |
|---|---|---|---|
| 2011/0050963 A1* | 3/2011 | Watabe | H04N 23/45 348/240.2 |
| 2011/0234853 A1 | 9/2011 | Hayashi et al. | |
| 2012/0147204 A1* | 6/2012 | Jeong | H04N 5/772 348/E5.045 |
| 2013/0235224 A1* | 9/2013 | Park | H04N 23/64 348/E5.024 |
| 2013/0342730 A1* | 12/2013 | Lee | H04R 5/04 348/231.4 |
| 2014/0126726 A1* | 5/2014 | Heiman | H04R 5/04 381/26 |
| 2014/0314391 A1* | 10/2014 | Kim | G06F 3/04842 386/248 |
| 2014/0362253 A1 | 12/2014 | Kim et al. | |
| 2015/0019969 A1* | 1/2015 | Lee | G06F 16/7844 715/719 |
| 2015/0326793 A1 | 11/2015 | Makinen et al. | |
| 2016/0360150 A1* | 12/2016 | Onno | H04N 7/15 |
| 2017/0272698 A1* | 9/2017 | Liu | H04N 23/73 |
| 2018/0278836 A1 | 9/2018 | Siminoff et al. | |
| 2019/0364195 A1* | 11/2019 | Kim | H04N 23/45 |
| 2020/0267326 A1* | 8/2020 | Yim | H04N 23/57 |
| 2021/0281739 A1 | 9/2021 | Takahashi | |
| 2022/0159183 A1* | 5/2022 | Li | H04N 23/635 |
| 2022/0417433 A1* | 12/2022 | Wei | H04N 23/62 |

FOREIGN PATENT DOCUMENTS

| | | |
|---|---|---|
| CN | 106162206 A | 11/2016 |
| CN | 110072070 A | 7/2019 |
| CN | 110505403 A | 11/2019 |
| CN | 110572600 A | 12/2019 |
| CN | 110740259 A | 1/2020 |
| EP | 3503579 A1 | 6/2019 |
| JP | 2003018543 A | 1/2003 |
| JP | 2004312144 A | 11/2004 |
| JP | 2006314078 A | 11/2006 |
| JP | 2007281966 A | 10/2007 |
| JP | 2011205530 A | 10/2011 |
| JP | 2013243455 A | 12/2013 |
| JP | 2016086320 A | 5/2016 |
| WO | 2009141951 A1 | 11/2009 |
| WO | 2020022055 A1 | 1/2020 |

\* cited by examiner

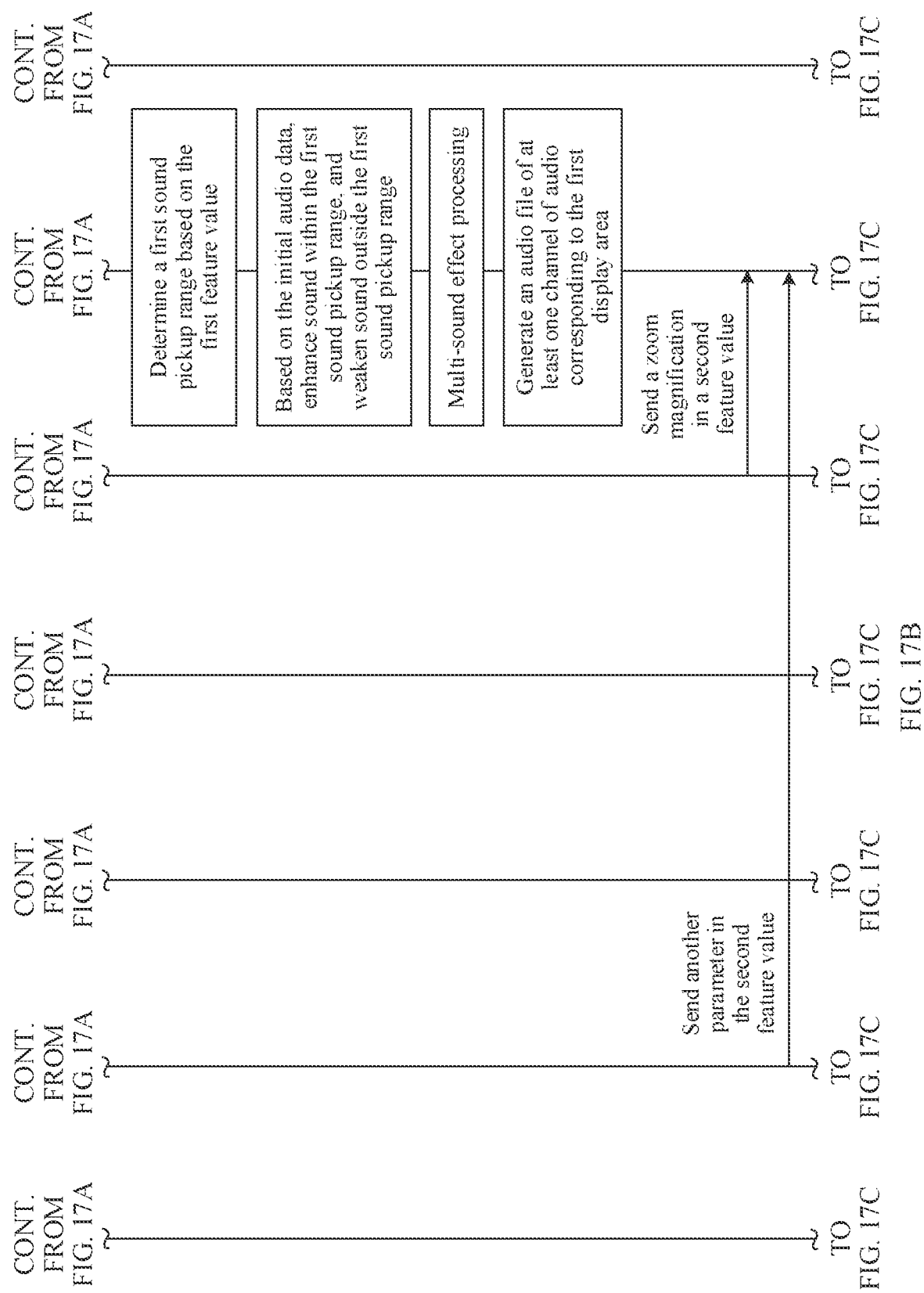

AUDIO PROCESSING METHOD AND DEVICE

CROSS-REFERENCE TO RELATED APPLICATIONS

This is a U.S. National Stage of International Patent Application No. PCT/CN2021/078268 filed on Feb. 26, 2021, which claims priority to Chinese Patent Application No. 202010153146.5 filed on Mar. 6, 2020. Both of the aforementioned applications are hereby incorporated by reference in their entireties.

TECHNICAL FIELD

Embodiments of this application relate to the field of electronic technologies, and in particular, to an audio processing method and a device.

BACKGROUND

As a computing capability and a hardware capability of an electronic device such as a mobile phone or a tablet computer improve, a video recording function of the electronic device becomes increasingly powerful. For example, some electronic devices may support multi-channel video recording, which is alternatively referred to as multi-view video recording.

In an existing multi-channel video recording mode, the electronic device may record audio and a plurality of channels of video images. For example, the electronic device may separately record a panoramic video image and a close-up video image. During video playback, the electronic device may play the audio and the plurality of channels of video images.

SUMMARY

Embodiments of this application provide an audio processing method and a device. In a multi-channel video recording mode, a plurality of channels of video images and a plurality of channels of audio can be recorded with reference to a feature value such as a zoom magnification, and different audio can be played during video playback, to improve audio experience of a user during multi-channel video recording.

To achieve the foregoing objective, the following technical solutions are used in the embodiments of this application.

According to one aspect, the embodiments of this application provide an audio processing method applied to an electronic device. The electronic device includes a first camera and a second camera. The method includes: The electronic device displays a shooting preview interface after detecting an operation performed by a user to open a camera application. Then, the electronic device enters a multi-channel video recording mode. The electronic device displays a shooting interface after detecting a shooting operation of the user, where the shooting interface includes a first display area and a second display area, the first display area is used to display a first video image captured by the first camera, and the second display area is used to display a second video image captured by the second camera. Then, the electronic device simultaneously records the first video image and the second video image by using the first camera and the second camera. The electronic device records audio of a plurality of sound channels, where the audio of the plurality of sound channels includes panoramic audio, first audio corresponding to the first video image, and second audio corresponding to the second video image. That the electronic device records the first audio in the audio of the plurality of sound channels includes: The electronic device records the first audio based on a feature value corresponding to the first display area, where the feature value includes a zoom magnification of the first camera.

In this solution, in the multi-channel video recording mode, the electronic device may record the audio of the plurality of sound channels while recording the plurality of channels of video images. The audio of the plurality of sound channels includes the panoramic audio and audio corresponding to each video image. The audio corresponding to the video image is related to a feature value such as a zoom magnification corresponding to a display area in which the video image is located. In this way, during video playback, the user may select to play the panoramic audio or audio corresponding to a video image that the user focuses on, to improve audio experience of the user.

In a possible design, the feature value further includes a front/rear attribute parameter corresponding to the first display area, and the front/rear attribute parameter is used to indicate whether the first video image is a video image shot by a front camera or a video image shot by a rear camera.

In other words, the electronic device may further record, based on the front/rear attribute parameter corresponding to the first display area, the audio corresponding to the first video image.

In another possible design, the feature value further includes a distance between the first camera and a frame of the electronic device and/or a focal length range of the first camera.

In other words, the electronic device may further record, based on the distance between the first camera and the frame of the electronic device and/or the focal length range of the first camera, the audio corresponding to the first video image.

In another possible design, before the electronic device records the audio of the plurality of sound channels, the method further includes: The electronic device captures sound signals in all directions, and obtains initial audio data based on the sound signals. That the electronic device records the first audio based on a feature value corresponding to the first display area includes: The electronic device determines, based on the feature value corresponding to the first display area, a first sound pickup range corresponding to the first display area, and the electronic device records the first audio based on the first sound pickup range and the initial audio data.

In other words, the electronic device may determine the first sound pickup range based on the feature value corresponding to the first display area, to record the first audio based on the first sound pickup range.

In another possible design, the audio of the plurality of sound channels further includes third audio corresponding to the first video image.

In other words, the electronic device may record audio of a plurality of sound channels corresponding to the first video image.

In another possible design, that the electronic device records the third audio includes: The electronic device determines a first reference sound pickup range based on the first sound pickup range, and records the third audio based on the first reference pickup range and the initial audio data.

In other words, the electronic device may determine the nearby first reference sound pickup range based on the first sound pickup range, to record, based on the first reference sound pickup range, another audio corresponding to the first video image.

In another possible design, the audio of the plurality of sound channels further includes fourth audio, the fourth audio includes fifth audio for first duration and sixth audio for second duration, the fifth audio is the panoramic audio, the sixth audio includes audio corresponding to a first zoom magnification of the first camera, the first camera performs shooting by using a second zoom magnification in the first duration, and performs shooting by using the first zoom magnification in the second duration.

In this solution, when the user adjusts the zoom magnification in the first display area, the user may want to focus on a video image and a sound pickup range that correspond to an adjusted zoom magnification. Therefore, the electronic device may combine the panoramic audio and subsequent audio corresponding to the first display area into dynamically changing panoramic audio, to highlight audio corresponding to the zoom magnification adjusted by the user, and enhance audio change experience of the user after zooming.

In another possible design, the first display area further includes a front/rear switching control, and the front/rear switching control is used to perform front/rear camera switching.

In this way, the electronic device may further switch the front camera and the rear camera that are used for the first display area.

In another possible design, the electronic device further includes a third camera, and the first display area includes a camera switching control. The method further includes: In response to an operation on the camera switching control, the electronic device displays, in the first display area, a video image captured by the third camera, where the first camera is a rear wide-angle camera, and the third camera is a rear long-focus camera.

In this solution, the electronic device may directly switch to a corresponding target camera by using the camera switching control indicated by a user, and capture a video image by using the target camera.

In another possible design, the first display area further includes a first zoom adjustment control, and the first zoom adjustment control is used to adjust the zoom magnification of the first camera; and the second display area further includes a second zoom adjustment control, and the second zoom adjustment control is used to adjust a zoom magnification of the second camera.

In this way, respective zoom magnifications of the first display area and the second display area may be adjusted.

In another possible design, the method further includes: When determining that a third zoom magnification set by the user for the first display area exceeds the focal length range of the first camera, the electronic device prompts the user to switch to a fourth camera; and the electronic device displays, in the first display area, a video image captured by the fourth camera based on the third zoom magnification.

In this solution, after the third zoom magnification exceeds the focal length range of the first camera corresponding to the first display area, the electronic device may switch to the fourth camera, and directly capture a video image in the first display area by using the third zoom magnification, to continuously change a zoom magnification.

In another possible design, the first display area corresponds to a first focal length range, the second display area corresponds to a second focal length range, and the first focal length range is different from the second focal length range. The method further includes: When determining that a fourth zoom magnification set by the user for the first display area exceeds the first focal length range and falls within the second focal length range, the electronic device prompts the user to perform a zoom operation on the second display area; and the electronic device displays, in the second display area, a video image captured by the second camera based on the fourth zoom magnification.

In this solution, after the fourth zoom magnification exceeds the focal length range corresponding to the first display area and falls within the focal length range corresponding to the second display area, the electronic device directly captures a video image in the second display area by using the fourth zoom magnification, to continuously change a zoom magnification in different display areas.

In another possible design, after the electronic device detects the shooting operation of the user, the method further includes: The electronic device generates a multi-channel recorded video after detecting an operation performed by the user to stop shooting, where the multi-channel recorded video includes the first video image, the second video image, and the audio of the plurality of sound channels. The electronic device displays a video playback interface after detecting an operation performed by the user to play the multi-channel recorded video, where the video playback interface includes the first video image and the second video image. The electronic device automatically plays the panoramic audio.

In other words, during video playback, the electronic device may play the plurality of channels of video images and the panoramic audio by default.

In another possible design, the video playback interface further includes an audio switching control. After the electronic device automatically plays the panoramic audio, the method further includes: The electronic device plays the first audio or the second audio after detecting an operation performed by the user on the audio switching control, and the electronic device stops playing the panoramic audio.

In this way, based on the audio switching control, the electronic device may play corresponding audio according to an indication of the user.

In another possible design, after the electronic device displays the video playback interface, the method further includes: After detecting an operation performed by the user to play the first video image, the electronic device displays the first video image in the video playback interface, and stops displaying the second video image; and the electronic device automatically plays the first audio corresponding to the first video image.

In this solution, the electronic device may play a single channel of video image according to an indication of the user, and automatically play audio corresponding to the video image.

In another possible design, that the electronic device displays the first video image in the video playback interface includes: The electronic device displays the first video image in a scaling up manner or in full screen in the video playback interface.

In this way, when the user indicates to play only the first video image, the electronic device may focus on and highlight the first video image, to improve visual experience of the user.

In another possible design, the first video image and the second video image included in the multi-channel recorded video are saved as a same video file.

In another possible design, the first video image included in the multi-channel recorded video is saved as a first video file, and the second video image included in the multi-channel recorded video is saved as a second video file.

In this way, during video playback, the electronic device may play only the first video image based on the first video file, or may play only the second video image based on the second video file.

In another possible design, before the electronic device displays the shooting interface, the method further includes: The electronic device determines a quantity of display areas. That the electronic device displays the shooting interface includes: The electronic device displays the shooting interface based on the quantity of display areas.

In this way, the electronic device may display the corresponding quantity of display areas in the shooting interface based on the determined quantity of display areas.

According to another aspect, the embodiments of this application provide an electronic device, including: a plurality of microphones, configured to capture sound signals; a first camera and a second camera, configured to capture video images; a screen, configured to display an interface; an audio playing component, configured to play audio; one or more processors; a memory; and one or more computer programs. The one or more computer programs are stored in the memory, and the one or more computer programs include instructions. When the instructions are executed by the electronic device, the electronic device is enabled to perform the following steps: displaying a shooting preview interface after detecting an operation performed by the user to open a camera application; entering a multi-channel video recording mode; displaying a shooting interface after detecting a shooting operation of the user, where the shooting interface includes a first display area and a second display area, the first display area is used to display a first video image captured by the first camera, and the second display area is used to display a second video image captured by the second camera; simultaneously recording the first video image and the second video image by using the first camera and the second camera; and recording audio of a plurality of sound channels, where the audio of the plurality of sound channels includes panoramic audio, first audio corresponding to the first video image, and second audio corresponding to the second video image; and the recording the first audio in the audio of the plurality of sound channels includes: recording the first audio based on a feature value corresponding to the first display area, where the feature value includes a zoom magnification of the first camera.

In a possible design, the feature value further includes a front/rear attribute parameter corresponding to the first display area, and the front/rear attribute parameter is used to indicate whether the first video image is a video image shot by a front camera or a video image shot by a rear camera.

In another possible design, the feature value further includes a distance between the first camera and a frame of the electronic device and/or a focal length range of the first camera.

In another possible design, when the instructions are executed by the electronic device, the electronic device is further enabled to perform the following steps: before recording the audio of the plurality of sound channels, capturing sound signals in all directions, and obtaining initial audio data based on the sound signals; and the recording the first audio based on a feature value corresponding to the first display area includes: determining, based on the feature value corresponding to the first display area, a first sound pickup range corresponding to the first display area; and recording the first audio based on the first sound pickup range and the initial audio data.

In another possible design, the audio of the plurality of sound channels further includes third audio corresponding to the first video image.

In another possible design, the recording the third audio includes: determining a first reference sound pickup range based on the first sound pickup range, and recording the third audio based on the first reference pickup range and the initial audio data.

In another possible design, the audio of the plurality of sound channels further includes fourth audio, the fourth audio includes fifth audio for first duration and sixth audio for second duration, the fifth audio is the panoramic audio, the sixth audio includes audio corresponding to a first zoom magnification of the first camera, the first camera performs shooting by using a second zoom magnification in the first duration, and performs shooting by using the first zoom magnification in the second duration.

In another possible design, the first display area further includes a front/rear switching control, and the front/rear switching control is used to perform front/rear camera switching.

In another possible design, the electronic device further includes a third camera, and the first display area includes a camera switching control. When the instructions are executed by the electronic device, the electronic device is further enabled to perform the following step: in response to an operation on the camera switching control, displaying, in the first display area, a video image captured by the third camera, where the first camera is a rear wide-angle camera, and the third camera is a rear long-focus camera.

In another possible design, the first display area further includes a first zoom adjustment control, and the first zoom adjustment control is used to adjust the zoom magnification of the first camera; and the second display area further includes a second zoom adjustment control, and the second zoom adjustment control is used to adjust a zoom magnification of the second camera.

In another possible design, when the instructions are executed by the electronic device, the electronic device is further enabled to perform the following steps: when determining that a third zoom magnification set by the user for the first display area exceeds the focal length range of the first camera, prompting the user to switch to a fourth camera; and displaying, in the first display area, a video image captured by the fourth camera based on the third zoom magnification.

In another possible design, the first display area corresponds to a first focal length range, the second display area corresponds to a second focal length range, and the first focal length range is different from the second focal length range. When the instructions are executed by the electronic device, the electronic device is further enabled to perform the following steps: when determining that a fourth zoom magnification set by the user for the first display area exceeds the first focal length range and falls within the second focal length range, prompting the user to perform a zoom operation on the zoom adjustment control of the second display area; and displaying, in the second display area, a video image captured by the second camera based on the fourth zoom magnification.

In another possible design, when the instructions are executed by the electronic device, the electronic device is further enabled to perform the following steps: after detecting the shooting operation of the user and detecting an operation performed by the user to stop shooting, generating a multi-channel recorded video, where the multi-channel recorded video includes the first video image, the second video image, and the audio of the plurality of sound channels; displaying a video playback interface after detecting an operation performed by the user to play the multi-channel recorded video, where the video playback interface includes the first video image and the second video image; and automatically playing the panoramic audio.

In another possible design, the video playback interface further includes an audio switching control. When the instructions are executed by the electronic device, the electronic device is further enabled to perform the following steps: after automatically playing the panoramic audio and detecting an operation performed by the user on the audio switching control, playing the first audio or the second audio, and stopping playing the panoramic audio.

In another possible design, when the instructions are executed by the electronic device, the electronic device is further enabled to perform the following steps: after displaying the video playback interface and detecting an operation performed by the user to play the first video image, displaying the first video image in the video playback interface, stopping displaying the second video image, and automatically playing the first audio corresponding to the first video image.

In another possible design, the displaying the first video image in the video playback interface includes: displaying the first video image in a scaling up manner or in full screen in the video playback interface.

In another possible design, the first video image included in the multi-channel recorded video is saved as a first video file, and the second video image included in the multi-channel recorded video is saved as a second video file.

In another possible design, when the instructions are executed by the electronic device, the electronic device is further enabled to perform the following steps: determining a quantity of display areas before displaying the shooting interface, and the displaying a shooting interface includes: displaying the shooting interface based on the quantity of display areas.

According to another aspect, the embodiments of this application provide an audio processing apparatus. The apparatus is included in an electronic device. The apparatus has a function of implementing behavior of the electronic device in any one of the foregoing aspects and the possible designs, so that the electronic device performs the audio processing method performed by the electronic device in any one of the possible designs of the foregoing aspects. The function may be implemented by hardware, or may be implemented by hardware executing corresponding software. The hardware or the software includes at least one module or unit corresponding to the functions. For example, the apparatus may include a multi-channel video recording module, an audio hardware module, an audio processing module, and a video playback module.

According to still another aspect, the embodiments of this application provide an electronic device, including one or more processors and a memory. The memory stores code. When the code is executed by the electronic device, the electronic device is enabled to perform the audio processing method performed by the electronic device in any possible design of the foregoing aspects.

According to another aspect, the embodiments of this application provide a computer-readable storage medium, including computer instructions. When the computer instructions are run on all electronic device, the electronic device is enabled to perform the audio processing method according to any possible design of the foregoing aspects.

According to still another aspect, the embodiments of this application provide a computer program product. When the computer program product is run on a computer, the computer is enabled to perform the audio processing method performed by the electronic device in any possible design of the foregoing aspects.

According to another aspect, the embodiments of this application provide a chip system, and the chip system is used in an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device is enabled to perform the audio processing method in any possible design of the foregoing aspects.

For beneficial effects corresponding to the foregoing other aspects, refer to the descriptions of the beneficial effects in the method aspects. Details are not described herein again.

BRIEF DESCRIPTION OF DRAWINGS

FIG. 11A-1 to FIG. 11A-3 are schematic diagrams of another group of interfaces according to an embodiment of this application;

FIG. 11B-1 to FIG. 11B-3 are schematic diagrams of another group of interfaces according to an embodiment of this application;

FIG. 11C-1 and FIG. 11C-2 are schematic diagrams of another group of interfaces according to an embodiment of this application;

FIG. 11D-1 and FIG. 11D-2 are schematic diagrams of another group of interfaces according to an embodiment of this application;

FIG. 17A to FIG. 17C are a flowchart of another audio processing method according to an embodiment of this application;

DESCRIPTION OF EMBODIMENTS

Figure 1:
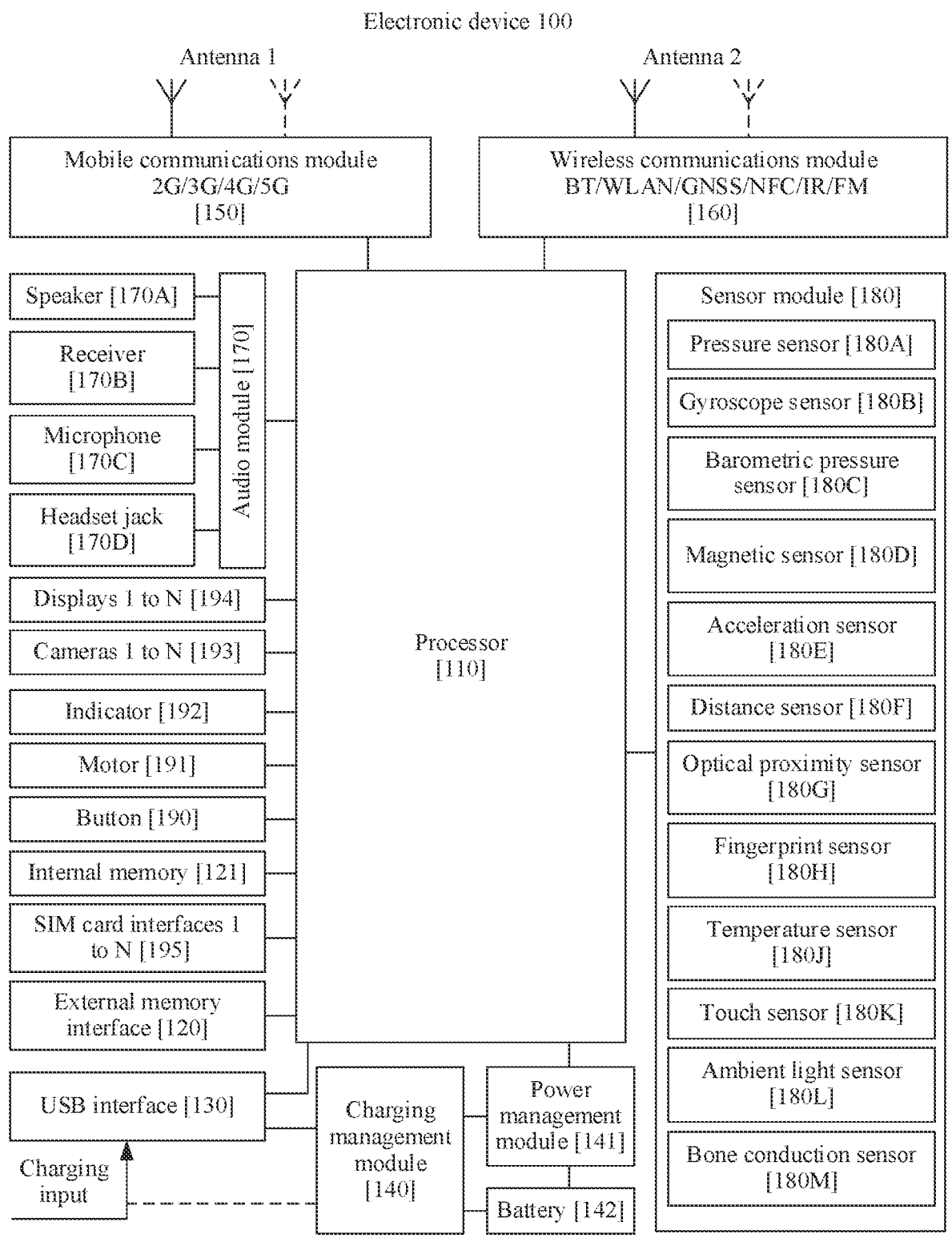
FIG. 1 is a schematic diagram of a structure of an electronic device according to an embodiment of this application.

The following describes the technical solutions in the embodiments of this application with reference to the accompanying drawings in the embodiments of this application. In the descriptions of the embodiments of this application, unless otherwise specified, "/" means "Or". For example, A/B may represent A or B. In this specification, "and/or" describes only an association between associated objects and represents that three relationships may exist. For example, A and/or B may represent the following three cases: Only A exists, both A and B exist, and only B exists. In addition, in the descriptions of the embodiments of this application, "a plurality of" means two or more than two.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise stated, "a plurality of" means two or more than two.

In a multi-channel video recording mode (or referred to as a multi-view video recording mode), an electronic device may record a plurality of channels of video images in a video recording process, that is, record video images of a plurality of channels.

The embodiments of this application provide an audio processing method in the multi-channel video recording mode. The electronic device can simultaneously record a plurality of channels of video images and a plurality of channels of audio in the multi-channel video recording mode. When playing back a multi-channel recorded video (video playback for short below), the electronic device may play different audio, so that audio experience of a user during multi-channel video recording can be improved.

For example, in the multi-channel video recording mode, the electronic device may record the plurality of channels of video images and the plurality of channels of audio with reference to a feature value such as a zoom magnification. The plurality of channels of audio recorded by the electronic device may include panoramic audio and at least one channel of audio corresponding to each display area. The panoramic audio records sound in a panoramic scope in all directions around the electronic device. Each channel of video on a display of the electronic device corresponds to one display area, and the at least one channel of audio corresponding to each display area may be recorded based on a feature value such as a zoom magnification currently corresponding to the display area, so that audio corresponding to each display area corresponds to a video image in the display area.

In this way, during video playback, the electronic device may play, according to an indication of the user, audio that interests the user, to play audio corresponding to a video image displayed in a display area that interests the user. This improves audio experience of the user.

However, in an existing multi-channel video recording mode, the electronic device records only one channel of audio, and can play only the channel of audio and cannot switch the audio during video playback. In addition, audio content cannot match video images in different display areas, and cannot match, in real time, a video image that the user focuses on, resulting in poor audio experience of the user.

The audio processing method provided in the embodiments of this application may be applied to the electronic device. For example, the electronic device may be a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or a dedicated camera (for example, a single-lens reflex camera or a card camera). A specific type of the electronic device is not limited in the embodiments of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instructions or the data from the memory, to avoid repeated access. This reduces waiting time of the processor 110, and improves system efficiency.

The charging management module 140 is configured to receive a charging input from a charger. The charger may be a wireless charger or a wired charger.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communication function of the electronic device 100 may be implemented by using the antenna 1, the antenna 2, the mobile communications module 150, the wireless communications module 160, the modem processor, the baseband processor, and the like.

The mobile communications module 150 may provide a solution that is for wireless communication including 2G/3G/4G/5G and the like and that is applied to the electronic device 100. The mobile communications module 150 may include at least one filter, a switch, a power amplifier, a low noise amplifier (low noise amplifier, LNA), and the like.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

In the embodiments of this application, the display 194 may display a shooting preview interface, a video recording preview interface, and a shooting interface in a multi-channel video recording mode, may further display a video playback interface during video playback, and the like.

The electronic device 100 may implement a shooting function by using the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The ISP may further perform algorithm optimization on noise, brightness, and complexion of the image. The ISP may further optimize parameters such as exposure and color temperature of a shooting scenario. In some embodiments, the ISP may be disposed in the camera 193. For example, in the embodiments of this application, the ISP may control, based on a shooting parameter, the photosensitive element to perform exposure and shooting.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like.

In some embodiments, the electronic device 100 may include one or N cameras 193, where N is a positive integer greater than 1. The camera 193 may be located in an edge area of the electronic device, may be an off-screen camera, or may be a pop-up camera. The cameras 193 may include a rear camera, and may further include a front camera. A specific location and form of the camera 193 are not limited in the embodiments of this application. The electronic device 100 may include cameras of a plurality of focal lengths. For example, cameras of different focal lengths may include a long-focus camera, a wide-angle camera, an ultra-wide-angle camera, a panoramic camera, or the like.

In the embodiments of this application, in the multi-channel video recording mode, different cameras may be configured to capture video images corresponding to different zoom magnifications. For example, the wide-angle camera, the ultra-wide-angle camera, or the panoramic camera may capture a video image corresponding to a relatively small zoom magnification, and the long-focus camera may capture a video image corresponding to a relatively large zoom magnification.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of encoding formats, for example, MPEG (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a mode of transmission between human brain neurons, and may further continuously perform self-learning. The electronic device 100 may implement intelligent cognition such as image recognition, facial recognition, speech recognition, and text understanding through the NPU.

The external memory interface 120 may be configured to connect to an external memory card such as a micro SD card, to extend a storage capability of the electronic device 100.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a sound playing function and an image playing function), and the like. The data storage area may store data (for example, an image captured by the electronic device 100, audio data, and a phone book) created in a process of using the electronic device 100, and the like.

In the embodiments of this application, the processor 110 may run the instructions stored in the internal memory 121 to record a plurality of channels of video images and a plurality of channels of audio in the multi-channel video recording mode, so that during video playback, audio corresponding to video images in different display areas can be played, and the played audio matches a video image that the user focuses on.

The electronic device 100 may implement audio functions such as music playing and recording by using the audio module 170, the speaker 170A, the receiver 170B, the microphone 170C, the headset jack 170D, the application processor, and the like.

The audio module 170 is configured to convert digital audio data into an analog audio electrical signal for output, and is also configured to convert an analog audio electrical signal input into digital audio data. The audio module 170 may include an analog-to-digital converter and a digital-to-analog converter. For example, the audio module 170 is configured to convert an analog audio electrical signal output by the microphone 170C into digital audio data.

The audio module 170 may further include an audio processing module. The audio processing module is configured to perform audio processing on digital audio data in the multi-channel video recording mode, to generate a plurality of channels of audio. For example, the audio processing module may be configured to determine, based on a feature value such as a zoom magnification corresponding to a display area, a sound pickup range of audio corresponding to the display area, enhance sound within the sound pickup range, weaken sound outside the sound pickup range, and then perform multi-sound effect processing and the like, to record and generate an audio file corresponding to the display area.

The audio module 170 may be further configured to code and decode audio data.

In some embodiments, the audio module 170 may be disposed in the processor 110, or some function modules of the audio module 170 are disposed in the processor 110.

The speaker 170A, also referred to as a "horn", is configured to convert an analog audio electrical signal into a sound signal. The electronic device 100 may be used to listen to music or answer a hands-free call by using the speaker 170A. In the embodiments of this application, when a multi-channel recorded video is played back, the speaker 170A may be configured to play audio corresponding to video images in different display areas.

The receiver 170B, also referred to as an "earpiece", is configured to convert an analog audio electrical signal into a sound signal. When the electronic device 100 answers a call or receives voice information, the receiver 170B may be placed near a human ear to listen to a voice.

The microphone 170C, also referred to as a "mike" or a "microphone", is configured to convert a sound signal into an analog audio electrical signal. When making a call or sending a voice message, a user may make a sound near the microphone 170C, to enter a sound signal to the microphone 170C.

In the embodiments of this application, the electronic device 100 may include at least three microphones 170C. The electronic device 100 may implement a function of capturing sound signals in all directions, and converting the captured sound signals into an analog audio electrical signal, and may further implement a noise reduction function, a sound source identification function, a directional recording function, or the like.

Figure 2:
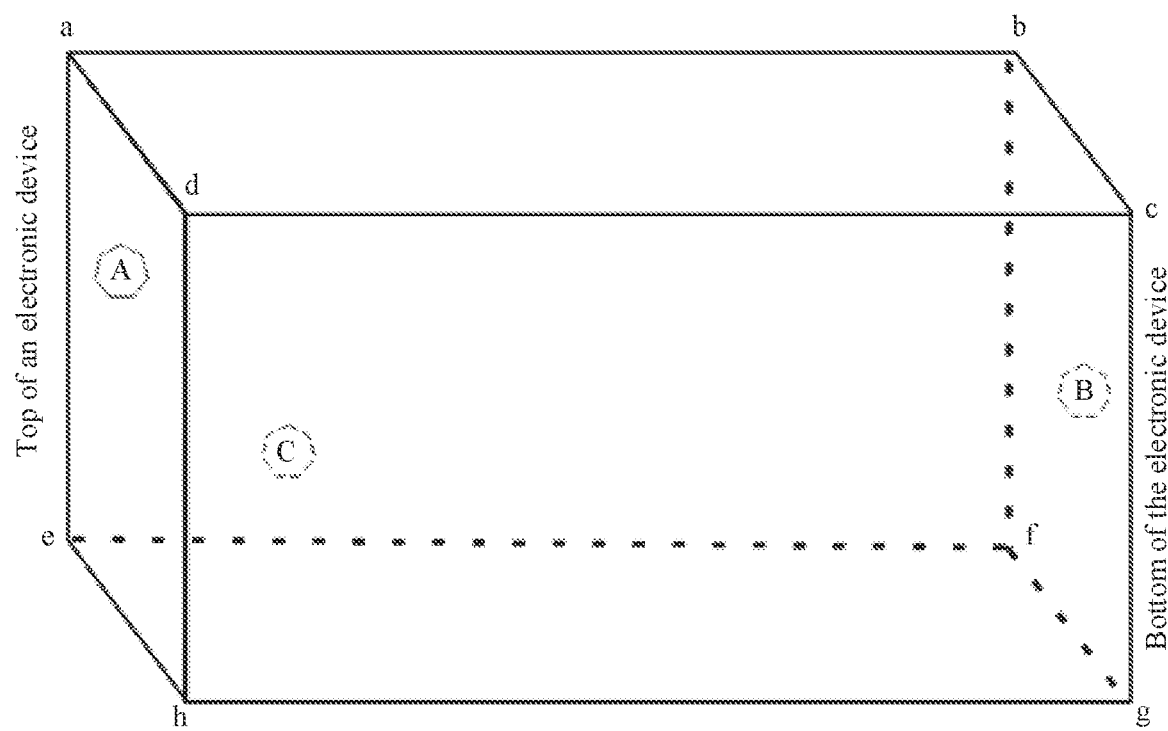
FIG. 2 is a schematic diagram of a layout of microphones according to an embodiment of this application.

For example, for a layout of the microphones 170C on the electronic device 100, refer to FIG. 2. As shown in FIG. 2, a front face cdhg of the electronic device 100 is a plane on which the display 194 is located, a microphone A is located on a plane adhe on the top of the electronic device 100, a microphone B is located on a plane bcgf on the bottom of the electronic device 100, and a microphone C is located on a rear face abfe of the electronic device 100. The combination of the microphones A to C may capture sound signals in all directions around the electronic device 100. It may be understood that the electronic device 100 may further include more microphones, for example, may further include a microphone disposed on the front of the screen.

It should be noted that the microphone 170C may be a built-in component of the electronic device 100, or may be an external accessory of the electronic device 100.

In some embodiments, the microphone 170C may be a directional microphone, and may capture a sound signal in a specific direction.

The distance sensor 180F is configured to measure a distance. The electronic device 100 may measure the distance in an infrared or a laser manner. In some embodiments, in a shooting scenario, the electronic device 100 may measure a distance by using the distance sensor 180F to implement quick focusing.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation acting on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 in a position different from that of the display 194.

For example, in the embodiments of this application, the electronic device 100 may detect, by using the touch sensor 180K, an operation performed by the user to indicate to start and/or stop video recording.

It may be understood that the structure shown in the embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components in the figure may be implemented by hardware, software, or a combination of software and hardware.

In the embodiments of this application, in the multi-channel video recording mode, the display 194 may display a shooting preview interface, a video recording preview interface, and a shooting interface during video recording. The camera 193 may be configured to capture a plurality of channels of video images. The plurality of microphones 170C may be configured to capture a sound signal, and generate an analog audio electrical signal. The audio module 170 may convert the analog audio electrical signal into digital audio data, and generate a plurality of channels of audio based on the digital audio data. During video playback, the display 194 may display a video playback interface. The processor 110 may run the instructions stored in the internal memory 121, to control, based on a selection of the user, the speaker 170A to play audio corresponding to a video image in a display area that the user focuses on, so as to improve audio experience of the user during multi-channel video recording.

Figure 3:
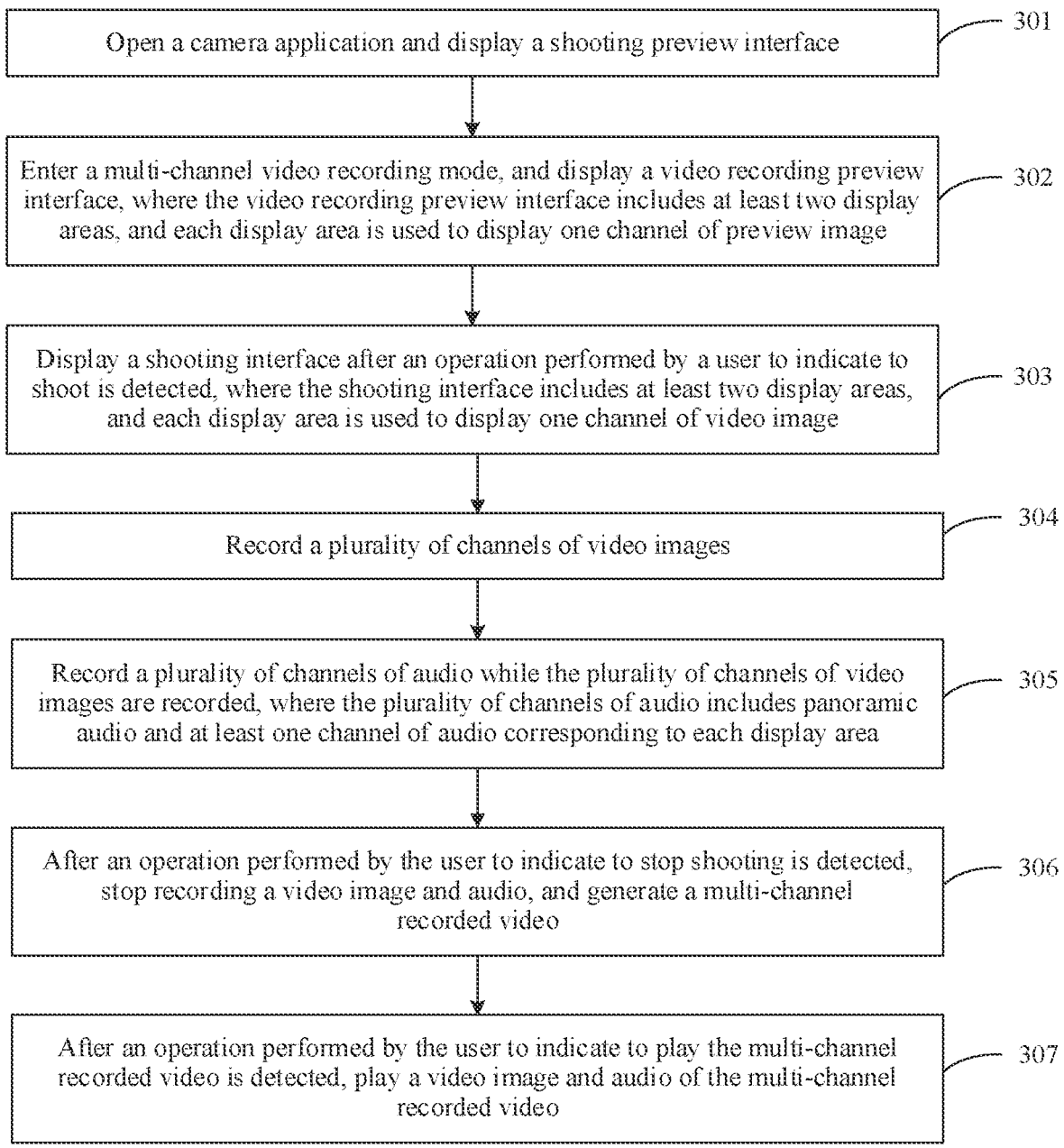
FIG. 3 is a flowchart of an audio processing method according to an embodiment of this application.

The following describes the audio processing method provided in the embodiments of this application by using an example in which the electronic device is a mobile phone having a structure shown in FIG. 1. Refer to FIG. 3. The method may include the following steps.

301: A mobile phone displays a shooting preview interface after detecting an operation performed by a user to open a camera application.

After detecting the operation performed by the user to open the camera application, the mobile phone may start the camera application (which may also be referred to as a camera for short below), and display the shooting preview interface. There may be a plurality of types of operations performed by the user to open the camera. For example, after detecting that the user taps a camera icon 401 shown in FIG. 4(*a*), the mobile phone may start the camera application and display a shooting preview interface shown in FIG. 4(*b*).

Figure 4A:
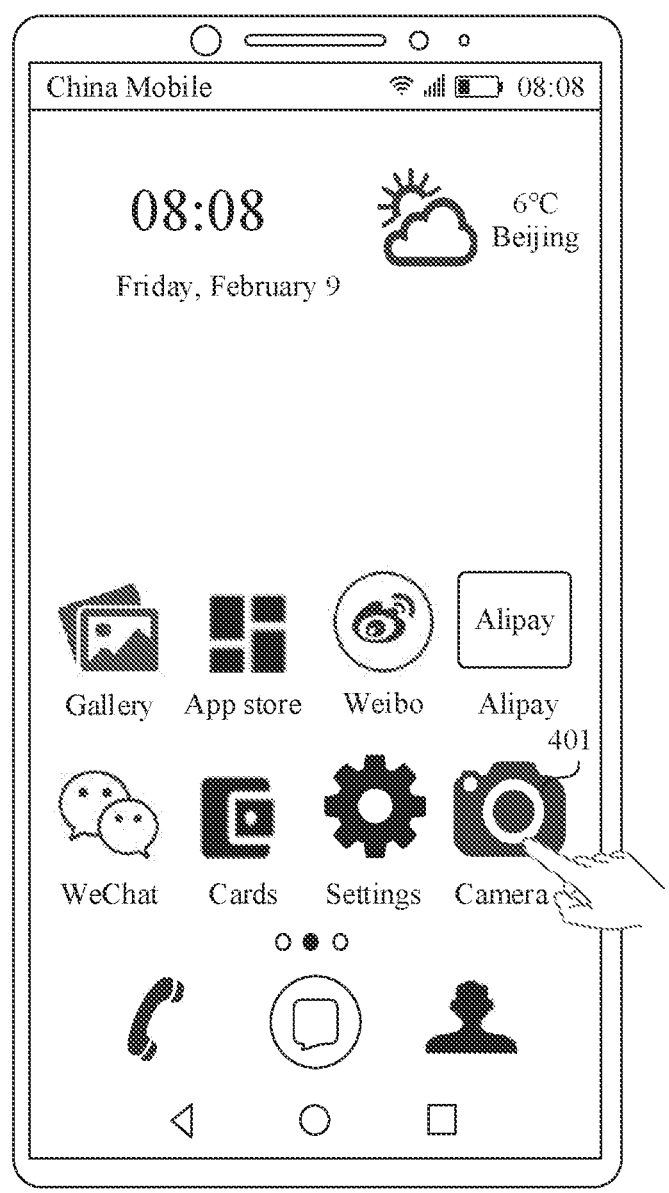
FIG. 4(a) to FIG. 4(c) are schematic diagrams of a group of interfaces according to an embodiment of this application.
Figure 4B:
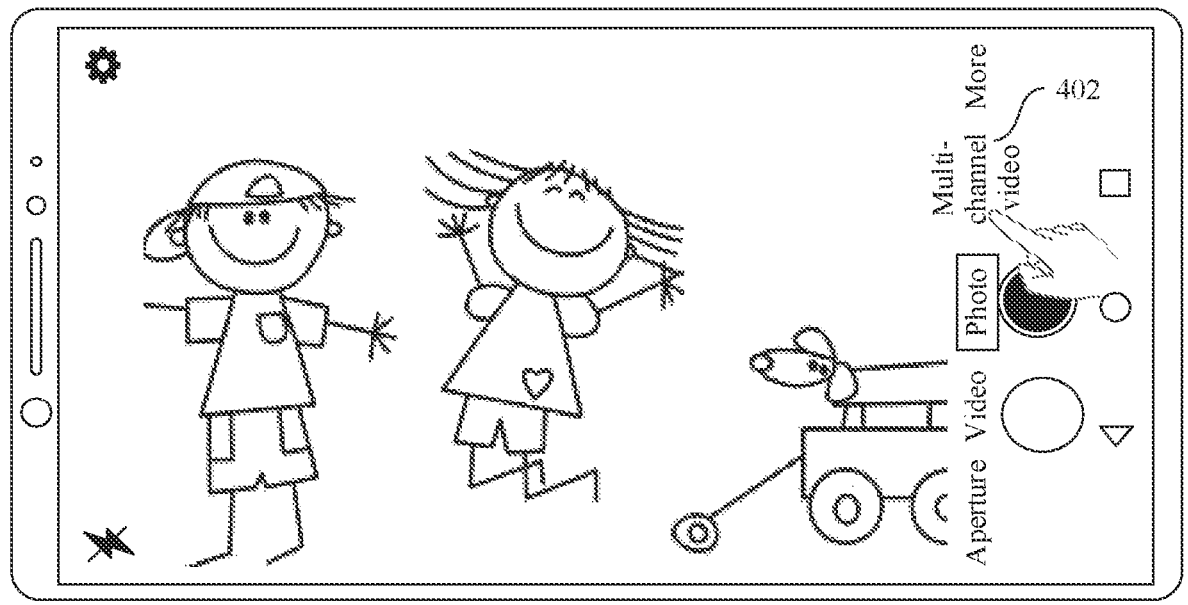
Figure 4C:
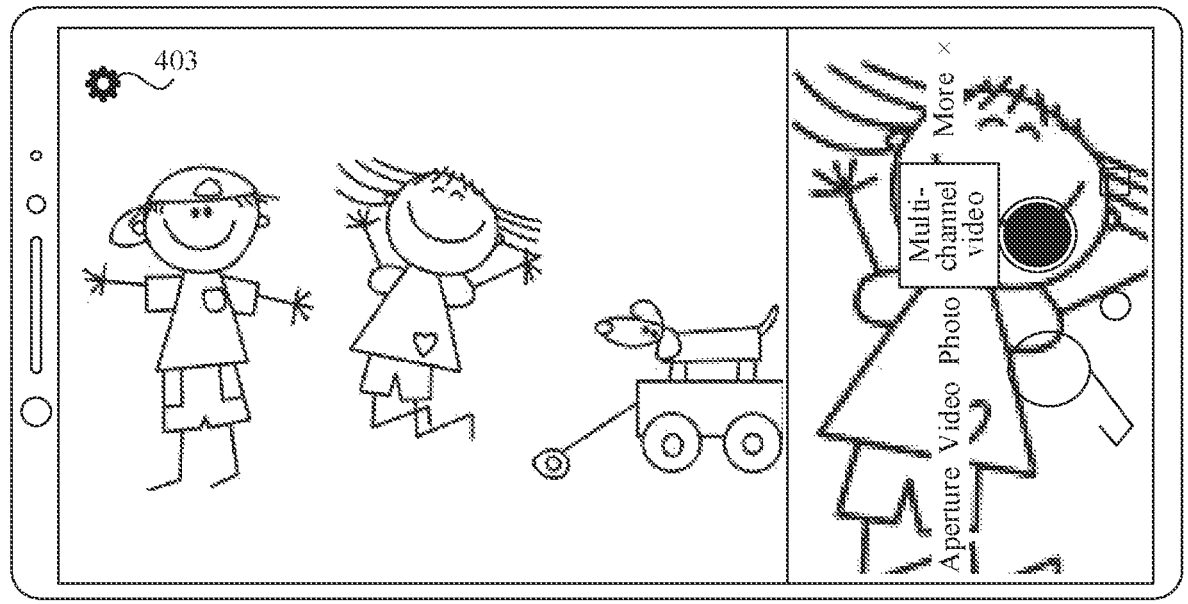

For another example, after detecting a voice indication operation performed by the user to open the camera, the mobile phone may start the camera application and display a shooting preview interface shown in FIG. 4(*b*).

302: The mobile phone enters a multi-channel video recording mode, and displays a video recording preview interface, where the video recording preview interface includes at least two display areas, and each display area is used to display one channel of preview image.

The mobile phone may enter the multi-channel video recording mode in a plurality of manners. For example, in some implementations, after starting the camera application, the mobile phone enters a non-multi-channel video recording mode by default, for example, a shooting mode or a video recording mode (namely, a single-channel video recording mode). The mobile phone enters the multi-channel video recording mode after detecting a preset operation 1 performed by the user to indicate to enter the multi-channel video recording mode. For example, the preset operation 1 may be a tapping operation performed by the user on a control 402 shown in FIG. 4(*b*). For example, in the multi-channel video recording mode, for the video recording preview interface displayed by the mobile phone, refer to FIG. 4(*c*).

In some other implementations, in the non-multi-channel video recording mode such as the shooting mode or the video recording mode (namely, the single-channel video recording mode), the mobile phone enters the multi-channel video recording mode after detecting an operation of drawing a preset track 1 (for example, a track "M") on a touchscreen by the user.

In some other implementations, in the video recording mode (namely, the single-channel video recording mode), the mobile phone may prompt, on the video recording preview interface, the user whether to enter the multi-channel video recording mode. The mobile phone may enter the multi-channel video recording mode according to an indication of the user.

In some other implementations, after starting the camera application, the mobile phone enters the multi-channel video recording mode by default.

In some other embodiments, the mobile phone may directly perform step 302 without performing step 301, to directly enter the multi-channel video recording mode. For example, when the screen is on and a home screen is displayed, or when the screen is off, if the mobile phone detects an operation of drawing a preset track (for example, a track "CM") on the touchscreen by the user, the mobile phone starts the camera application and directly enters the multi-channel video recording mode.

In some embodiments, after the mobile phone enters the multi-channel video recording mode, a quantity of display areas included in the video recording preview interface may be a preset quantity, a quantity that is preset by a user by using a setting interface of the mobile phone before the mobile phone enters the multi-channel video recording mode, or a quantity of display areas that are included when the multi-channel video recording mode is used last time. Each display area in the video recording preview interface is used to display one channel of preview image. Then, the mobile phone may further adjust the quantity of display areas according to an indication of the user, that is, adjust a quantity of channels of preview images.

Figure 5A:
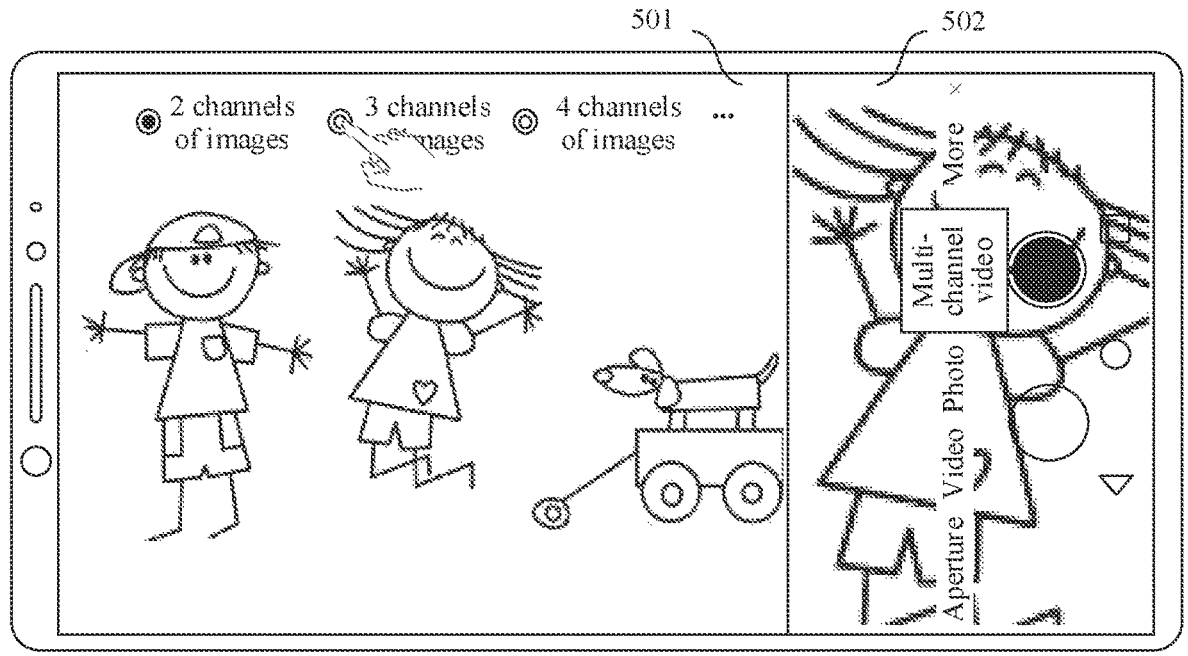
FIG. 5(a) to FIG. 5(c) are schematic diagrams of another group of interfaces according to an embodiment of this application.
Figure 5B:
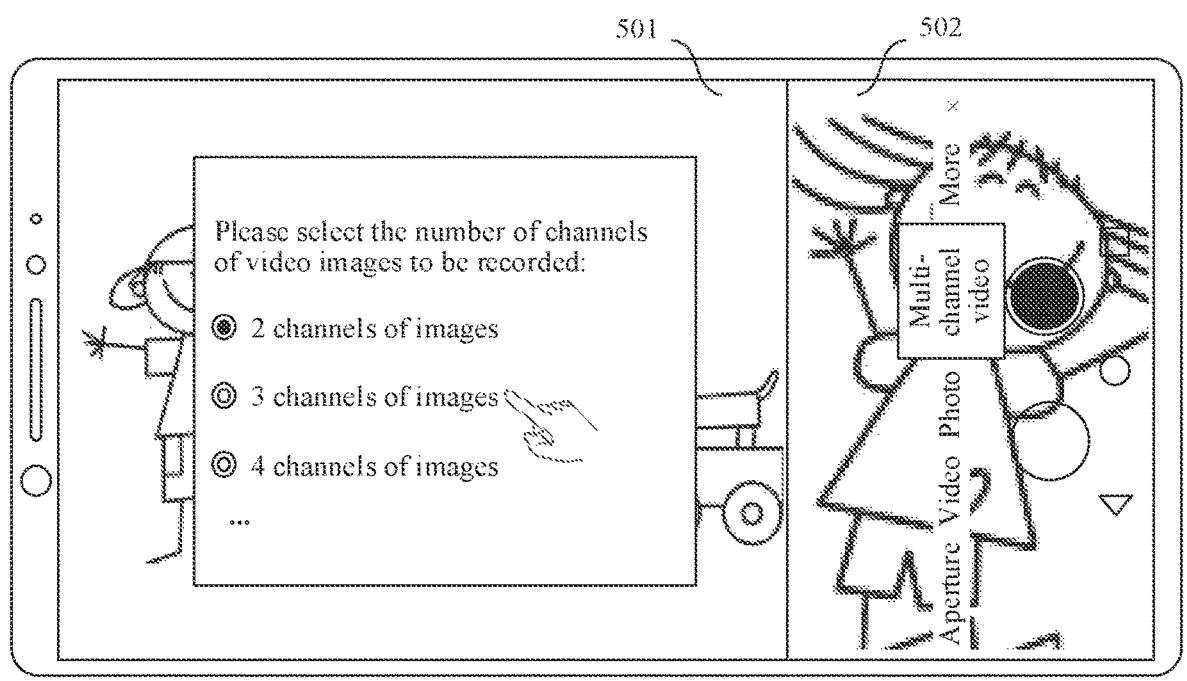
Figure 5C:
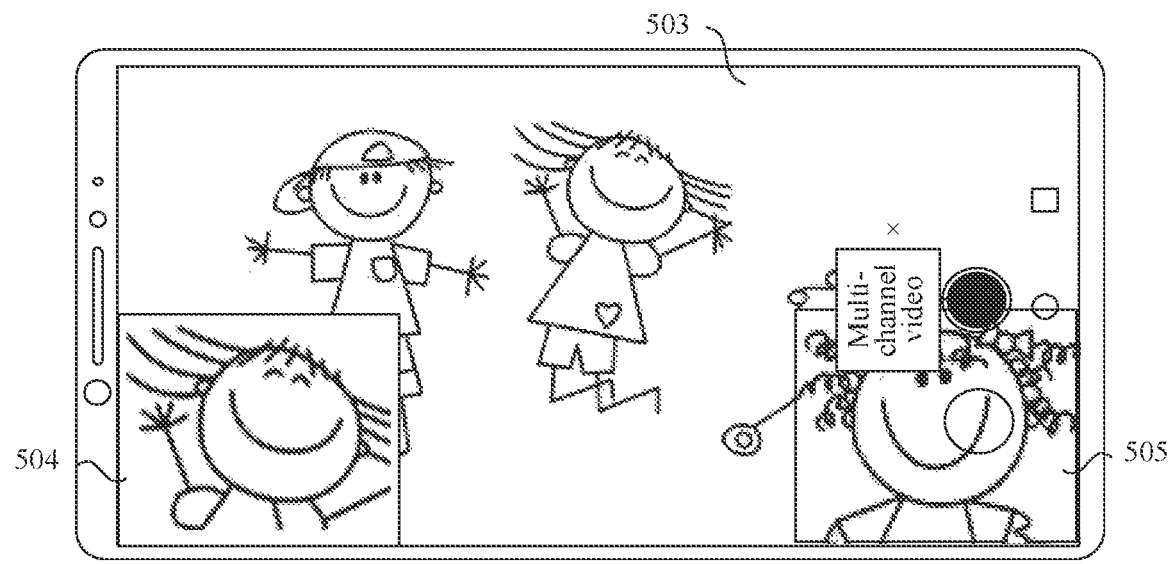

For example, after the mobile phone enters the multi-channel video recording mode, as shown in FIG. 5(*a*) and FIG. 5(*b*), the video recording preview interface may include two display areas and two channels of preview images: a display area 501 and a preview image in the display area 501, and a display area 502 and a preview image in the display area 502. After the mobile phone detects an operation performed by the user to select three channels of images, as shown in FIG. 5(*c*), the mobile phone displays three display areas and three preview images: a display area 503 and a preview image in the display area 503, a display area 504 and a preview image in the display area 504, and a display area 505 and a preview image in the display area 505.

For another example, after the mobile phone enters the multi-channel video recording mode, as shown in FIG. 4(*c*), the video recording preview interface may include two display areas and two channels of preview images. After detecting that the user taps a control 403 shown in FIG. 4(*c*), the mobile phone may display a shooting setting interface. In response to an operation performed by the user on the shooting setting interface, the mobile phone displays an interface, shown in FIG. 5(a), FIG. 5(b), or the like, that is used to set a quantity of display areas.

In some other embodiments, after entering the multi-channel video recording mode, the mobile phone displays an interface used to prompt the user to set a quantity of display areas. The mobile phone may set the quantity of display areas according to an indication of the user.

In some other embodiments, after the mobile phone enters the multi-channel video recording mode, the video recording preview interface may include a control used to set a quantity of display areas. After detecting that the user taps the control, the mobile phone may display an interface used to set a quantity of display areas. The mobile phone may set the quantity of display areas according to an indication of the user.

After the multi-channel video recording mode is entered, a zoom magnification corresponding to each display area in the video recording preview interface may be a preset zoom magnification, a zoom magnification used last time in the multi-channel video recording mode, a zoom magnification pre-indicated by the user, or the like. In addition, the zoom magnification corresponding to each display area may be further changed according to an indication of the user. A range and size of a video image in the display area vary with the zoom magnification.

In addition, a preview image in each display area may be switched between an image captured by a front camera and an image captured by a rear camera. For example, a video recording preview interface shown in FIG. 6(a) includes a display area 601 and a display area 602, and a preview image in each of the display area 601 and the display area 602 is an image captured by a rear camera. The display area 601 further includes a front/rear switching control 603, used to perform front/rear camera switching, and a preview image captured by a front/rear camera is displayed in the display area 601. The display area 602 further includes a front/rear switching control 604, also used to perform front/rear camera switching, and a preview image captured by a front/rear camera is displayed in the display area 602. For example, after detecting a tapping operation performed by the user on the control 604, the mobile phone may switch the rear camera to the front camera. Correspondingly, the preview image displayed in the display area 602 is switched from the preview image captured by the rear camera shown in FIG. 6(a) to a preview image captured by the front camera shown in FIG. 6(b).

303: The mobile phone displays a shooting interface after detecting an operation performed by the user to indicate to shoot, where the shooting interface includes at least two display areas, and each display area is used to display one channel of video image.

Figure 6A:
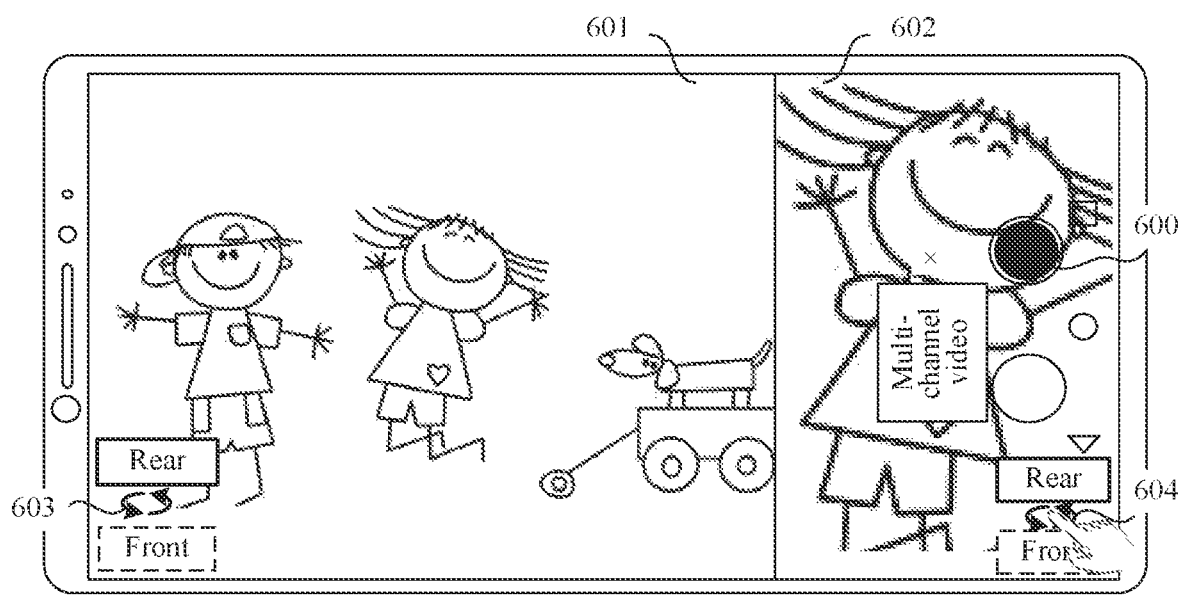
FIG. 6(a) to FIG. 6(c) are schematic diagrams of another group of interfaces according to an embodiment of this application.
Figure 6B:
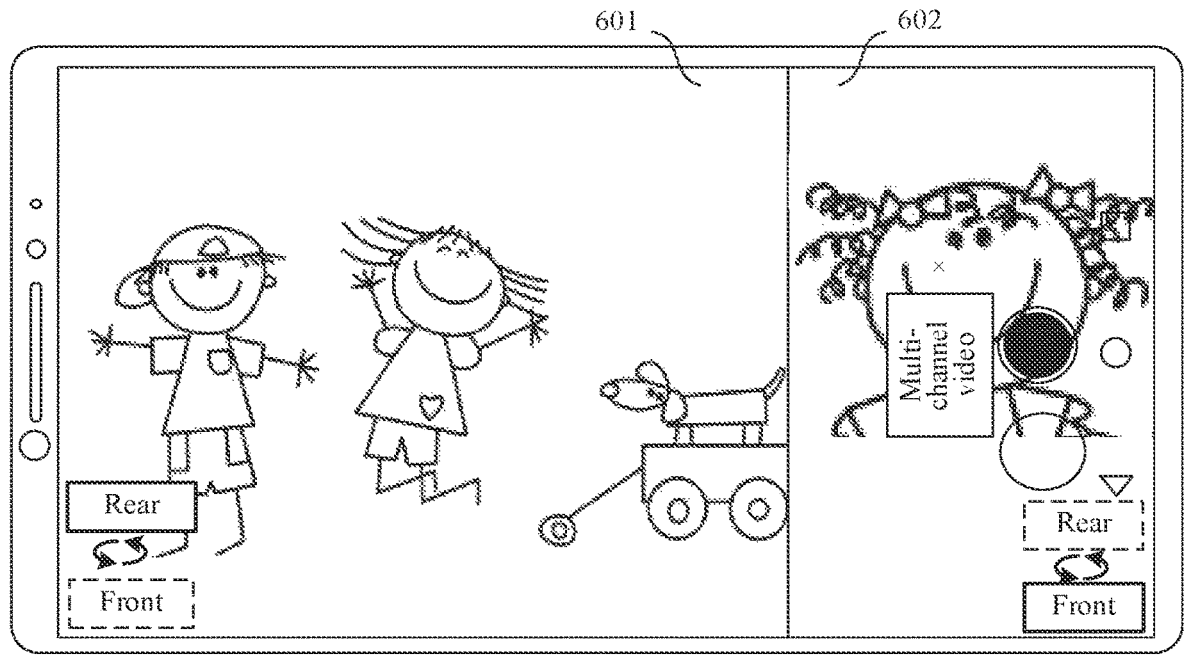

For example, the operation performed by the user to indicate to shoot may be a tapping operation performed by the user on a shooting control 600 shown in FIG. 6(a), a user voice indication operation, or another operation. This is not limited in this embodiment of this application. The mobile phone captures a plurality of channels of video images and displays the corresponding shooting interface after detecting the operation performed by the user to indicate to shoot, where the shooting interface includes at least two display areas, and each display area is used to display one channel of video image.

There may be a plurality of layout formats of the display areas and the plurality of channels of video images in the shooting interface, for example, a left/right stitching format, a left/middle/right stitching format, an up/down stitching format, an up/middle/down stitching format, or a picture-in-picture format.

Figure 6C:
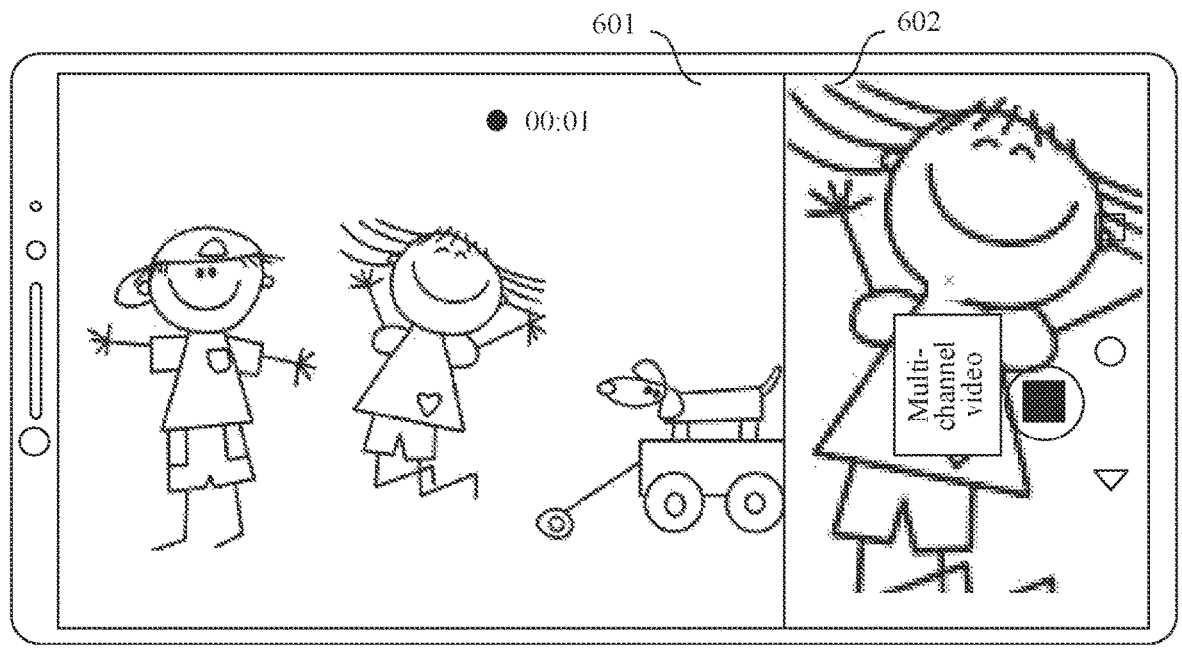

For example, for a schematic diagram of the shooting interface, refer to FIG. 6(c). The shooting interface includes a first display area 601 and a second display area 602, and the first display area 601 and the second display area 602 each display a video image shot by a rear camera. The first display area 601 displays an image of a relatively large shooting range shot by a wide-angle camera, and includes objects such as a little boy, a little girl, a toy car, and a puppy. The second display area 602 displays a close-up image of the little girl shot by another camera. As shown in FIG. 6(c), the shooting interface may further include an indicator used to indicate current video recording time.

For example, the first display area 601 and the second display area 602 each may display a video image shot by a different camera. For example, the first display area 601 displays a video image shot by a rear wide-angle camera, and the second display area 602 displays a video image shot by a rear long-focus camera. Alternatively, the first display area 601 displays a video image shot by a rear wide-angle camera, and the second display area 602 displays a video image shot by a front camera.

304: The mobile phone records a plurality of channels of video images.

After detecting the operation performed by the user to indicate to shoot, the mobile phone simultaneously records a plurality of channels of video images, and may perform processing such as video coding on the plurality of channels captured video images, to generate and store a video file.

In some embodiments, the plurality of channels of simultaneously recorded video images are saved as one video file. In some other embodiments, each channel of video image is saved as a separate video file. In this way, during subsequent video playback, the mobile phone may independently play one channel of video image.

305: After detecting the operation performed by the user to indicate to shoot, the mobile phone further records a plurality of channels of audio while recording the plurality of channels of video images, where the plurality of channels of audio includes panoramic audio and at least one channel of audio corresponding to each display area.

One channel of audio may include audio of one or more sound channels. For example, one channel of audio may be left-channel audio, or may be right-channel audio, or may include left-channel audio and right-channel audio, or may be stereo audio obtained after the left-channel and right-channel audio are mixed.

In other words, after detecting the operation performed by the user to indicate to shoot, the mobile phone further records audio of a plurality of sound channels while recording the plurality of channels of video images. The audio of the plurality of sound channels includes the panoramic audio and audio of at least one sound channel corresponding to each display area.

Figure 7:
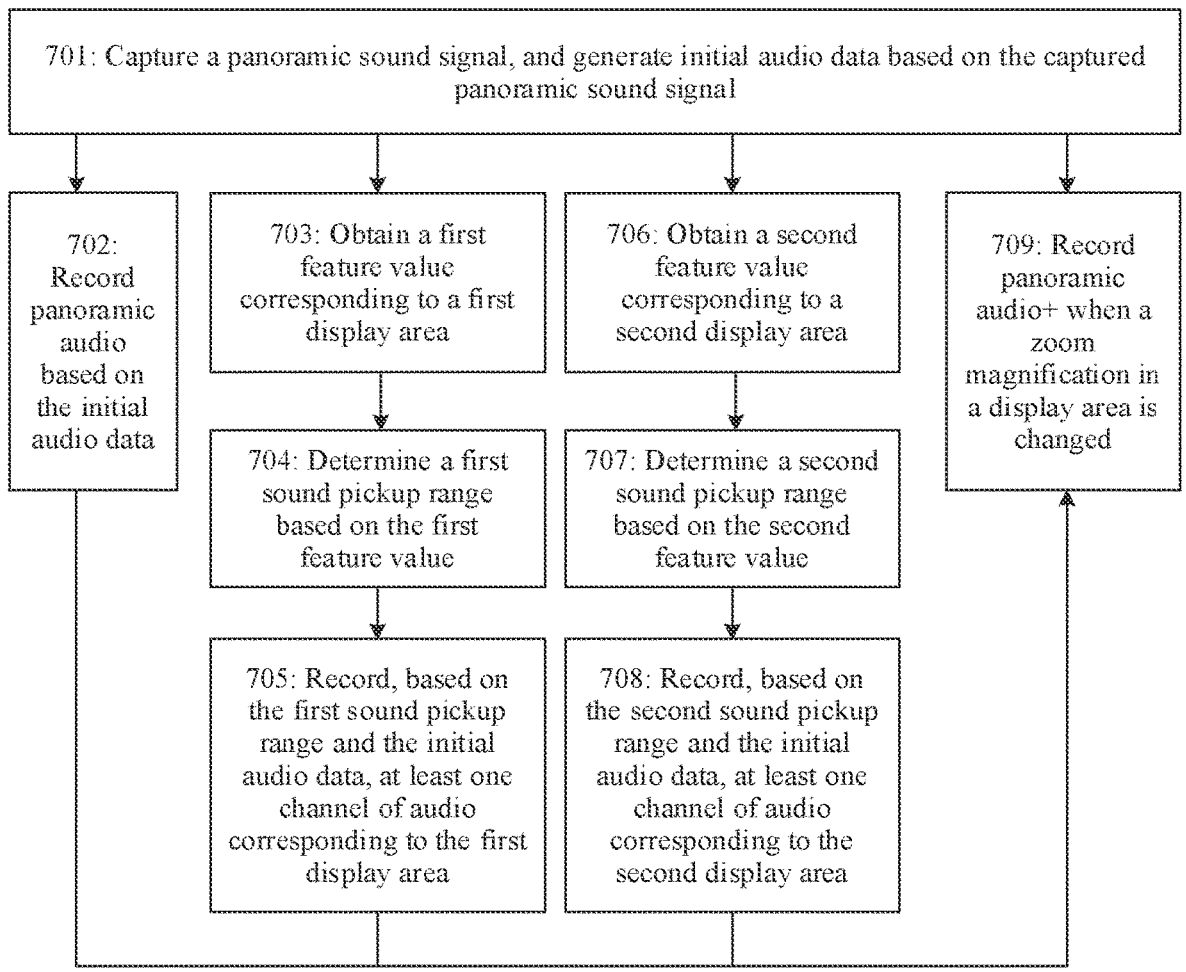
FIG. 7 is a flowchart of audio recording according to an embodiment of this application.

Refer to FIG. 7. Step 305 may include the following steps.

701: The mobile phone captures a panoramic sound signal, and generates initial audio data based on the captured panoramic sound signal.

The mobile phone may use a plurality of microphones (for example, the three microphones shown in FIG. 2) to capture sound signals in all directions around, that is, capture panoramic sound signals. The mobile phone converts the panoramic sound signals captured by the plurality of microphones into the initial audio data, where the initial audio data includes sound information in all directions.

Then, the mobile phone may record, based on the initial audio data, the panoramic audio and at least one channel of audio corresponding to each display area. The following describes a recording process of different audio:

(1) Panoramic Audio:

The initial audio data includes the sound information in all directions. The mobile phone may perform fusion processing on audio data of the microphones in the initial audio data, to obtain the panoramic audio by recording, where the panoramic audio includes sound in all directions around. As shown in FIG. 7, step 305 may further include the following step:

702: The mobile phone records the panoramic audio based on the initial audio data.

Sound pickup ranges of the three microphones may overlap. In a same direction, sound quality of a sound signal captured by a microphone may be relatively good (for example, the sound signal has a high signal-to-noise ratio, less spike noise, less glitch noise), and sound quality of a sound signal captured by another microphone may be relatively poor. Therefore, the mobile phone may select, from the initial audio data, audio data with relatively good sound quality in all directions for fusion processing, and further record and generate panoramic audio with a relatively good effect based on the processed audio data.

The following uses an example in which the shooting interface includes a first display area and a second display area for description. It may be understood that the shooting interface may also include more than two display areas.

In some embodiments, when recording a plurality of channels of audio corresponding to a plurality of display areas, the mobile phone may display audio recording prompt information in each display area, to prompt the user that audio corresponding to each display area is currently being recorded. For example, the audio recording prompt information may be microphone marks 801 and 802 shown in FIG. 8.

(2) At Least One Channel of Audio Corresponding to the First Display Area:

The following uses recording the at least one channel of audio corresponding to the first display area as an example for description, and a process of recording at least one channel of audio corresponding to the second display area is similar to this.

In this embodiment of this application, the mobile phone may obtain a first feature value corresponding to the first display area, and generate, based on the first feature value and the initial audio data, the at least one channel of audio corresponding to the first display area. Therefore, as shown in FIG. 7, step 305 may further include the following steps.

703: The mobile phone obtains the first feature value corresponding to the first display area.

704: The mobile phone determines, based on the first feature value, a first sound pickup range corresponding to the first display area.

For example, the first feature value corresponding to the first display area may include a front/rear attribute parameter of a video image corresponding to the first display area. The front/rear attribute parameter is used to indicate that the video image displayed in the first display area is a video image shot by a front camera (which is also referred to as a front video image in this specification for ease of description) or a video image shot by a rear camera (which is also referred to as a rear video image in this specification for ease of description). The front/rear attribute parameter may be used to determine whether the first sound pickup range is within a range of 180 degrees in the rear of the mobile phone or within a range of 180 degrees in the front of the mobile phone. For example, for a sound pickup range corresponding to the rear video image, refer to a range represented by an ellipse 901 in FIG. 9, and for a sound pickup range corresponding to the front video image, refer to a range represented by an ellipse 902 in FIG. 9.

For another example, the first feature value corresponding to the first display area may further include a zoom magnification currently corresponding to the first display area. A shooting range varies with a zoom magnification, and an image range displayed on the shooting interface varies with a zoom magnification. In addition, different zoom magnifications result in different image ranges that the user focuses on, and different sound pickup ranges that the user focuses on. The sound pickup range that the user focuses on is usually sound in the image range that the user focuses on. For example, when other parameters are the same, if a zoom magnification is increased to two times of an original zoom magnification, a sound pickup range may be decreased to ⅓ of an original sound pickup range. If a zoom magnification is increased to three times of an original zoom magnification, a sound pickup range may be decreased to ⅙ of an original sound pickup range. Therefore, the mobile phone may determine the first sound pickup range based on the zoom magnification corresponding to the first display area.

Figure 9:
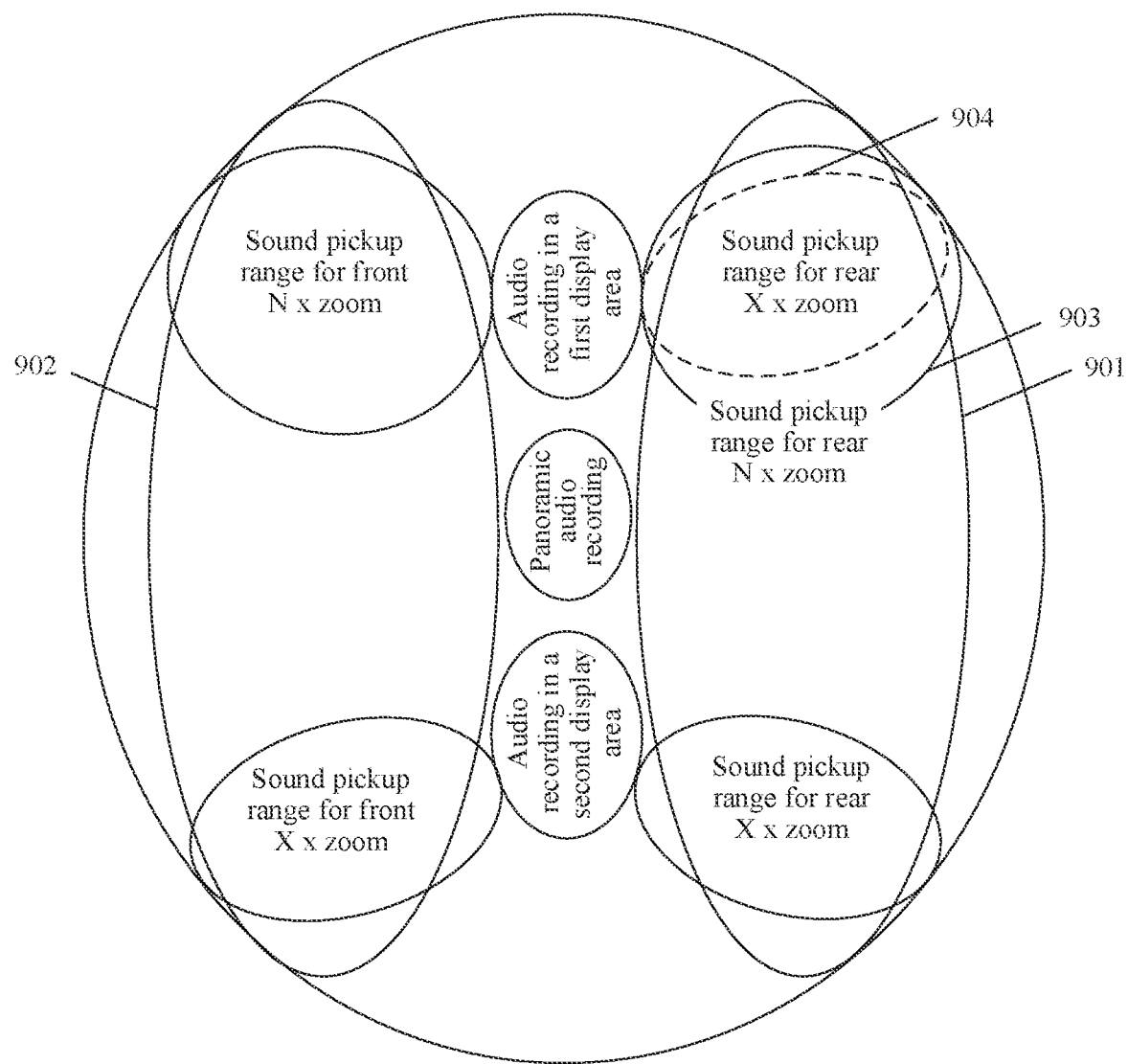
FIG. 9 is a schematic diagram of sound pickup ranges according to an embodiment of this application.

For example, for the first display area, for a sound pickup range corresponding to a zoom magnification N (namely, N×zoom), refer to a range represented by an ellipse 903 in FIG. 9. For a sound pickup range corresponding to a zoom magnification X (namely, X×zoom), refer to a range represented by a dashed ellipse 904 in FIG. 9. N is less than X.

Figure 10:
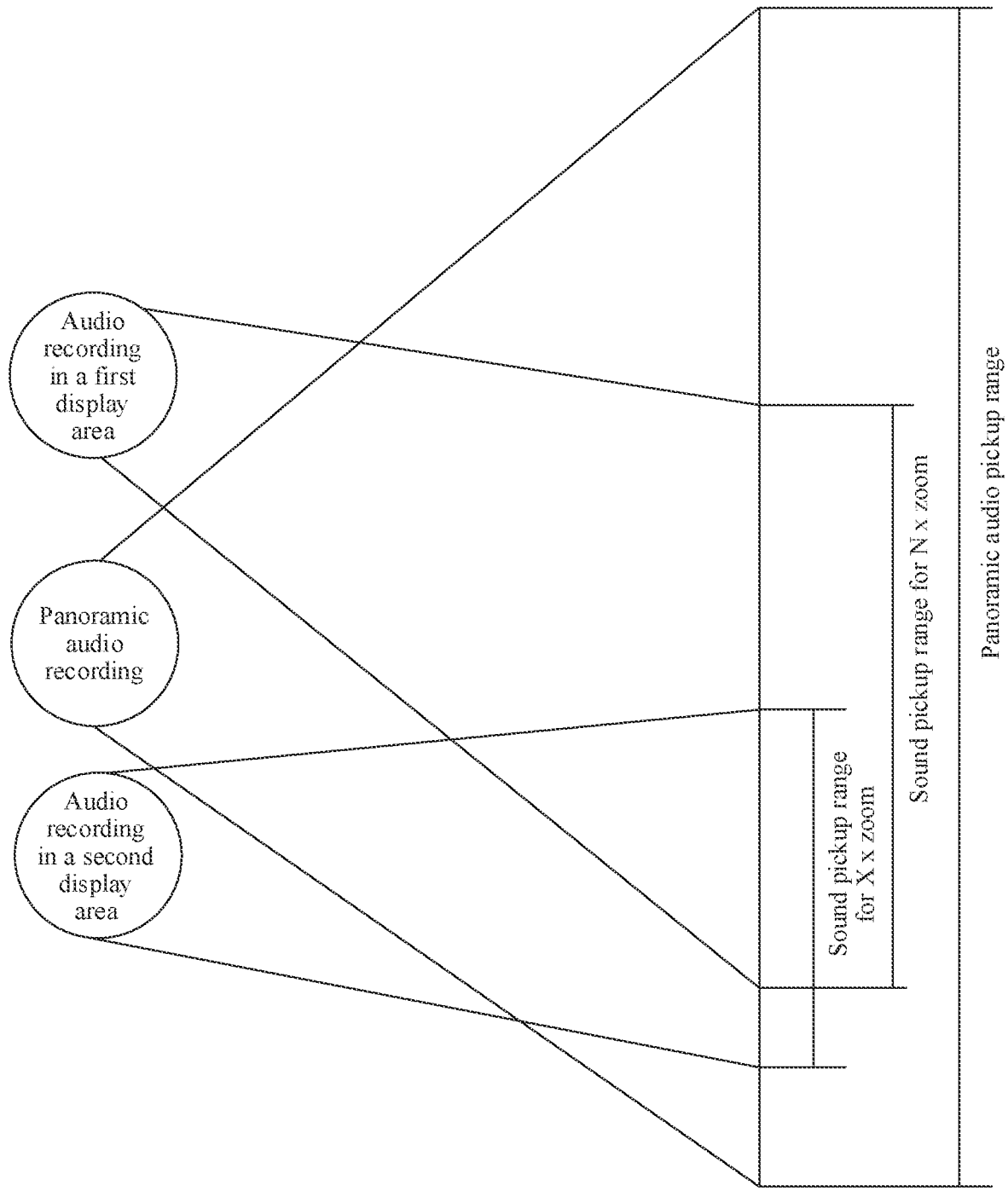
FIG. 10 is another schematic diagram of sound pickup ranges according to an embodiment of this application.

For another example, for a sound pickup range corresponding to a zoom magnification N (namely, N×zoom), refer to FIG. 10. The sound pickup range is a part of a sound pickup range of the panoramic audio.

In other words, the mobile phone may determine, based on the front/rear attribute parameter and the zoom magnification that correspond to the first display area, the first sound pickup range corresponding to the first display area. For example, when the front/rear attribute parameter corresponding to the first display area indicates a rear camera, and the zoom magnification is N, for the first sound pickup range corresponding to the first display area, refer to the range represented by the ellipse 903 in FIG. 9.

For another example, the first feature value corresponding to the first display area may further include a location of a first camera configured to capture a video image in the first display area. The location is used to indicate coordinates of the first camera on the mobile phone. For example, the location may be a location of the first camera relative to the upper left corner of the mobile phone, a distance of the first camera relative to a frame of the mobile phone, or the like. Different locations of the first camera indicate different shooting ranges corresponding to a same zoom magnification, different image ranges displayed on the shooting interface, and different sound pickup ranges corresponding to the image ranges. There may be one or more first cameras. This is not limited in this embodiment of this application.

For another example, the first feature value corresponding to the first display area may further include a type of the first camera configured to capture a video image in the first display area, and different types of the first camera correspond to different focal length ranges. For example, the types include a wide-angle camera type, a long-focus camera type, and an ultra-wide-angle camera type. Different types of the first camera may indicate different shooting ranges corresponding to a same zoom magnification and a same camera location, different image ranges displayed on the shooting interface, and different sound pickup ranges corresponding to the image ranges.

In this way, the mobile phone may determine, based on the first feature value corresponding to the first display area, such as the front/rear attribute parameter, the zoom magnification, and the location and/or the type of the first camera, the first sound pickup range corresponding to the first display area.

705: The mobile phone records, based on the first sound pickup range and the initial audio data, the at least one channel of audio corresponding to the first display area.

After determining the first sound pickup range corresponding to the first display area, the mobile phone may enhance sound in the first sound pickup range in the initial audio data, suppress (or weaken) sound outside the first sound pickup range, and then record the processed audio data to obtain a channel of audio corresponding to the first display area.

In this way, the audio corresponding to the first display area that is recorded is sound in the first sound pickup range, and the first sound pickup range is a sound pickup range determined based on the first feature value such as the zoom magnification corresponding to the first display area. Therefore, the first sound pickup range can match an image range that the user focuses on and that corresponds to the zoom magnification indicated by the user in the first display area. In other words, the audio corresponding to the first display area matches the video image that the user focuses on in the first display area.

In some embodiments, an error may exist between the first sound pickup range that is of the first display area and that is determined by the mobile phone based on the first feature value and the image range displayed in the first display area. Therefore, the mobile phone may determine one or more first reference sound pickup ranges near the first sound pickup range. For example, the first sound pickup range is an angle range of 0 degrees to 60 degrees, and the first reference sound pickup range may be an angle range of 350 degrees to 50 degrees, an angle range of 5 degrees to 65 degrees, an angle range of 5 degrees to 70 degrees, or the like near the first sound pickup range. In addition, the mobile phone may process the initial audio data, to enhance sound within the first reference sound pickup range, suppress sound outside the first reference sound pickup range, and further record processed audio data to obtain one or more channels of audio corresponding to the first display area.

In this way, the mobile phone may obtain, by recording based on the first sound pickup range and the first reference sound pickup range, a plurality of channels of audio that matches the first feature value of the first display area and the video image in the first display area, so that the user subsequently selects to play the plurality of channels of audio. Each channel of audio data corresponding to the first display area may be saved as one audio file, and the first display area may correspond to a plurality of audio files.

When the mobile phone records, based on the first sound pickup range and the first reference sound pickup range, a plurality of channels of audio corresponding to the first display area, the plurality of channels of audio provide the user with more channels of audio in different sound pickup ranges. A possibility of accurately matching the video image in the first display area that the user focuses on is greater, and a selectivity of audio playing by the user is also greater.

Figures 1, 11A:
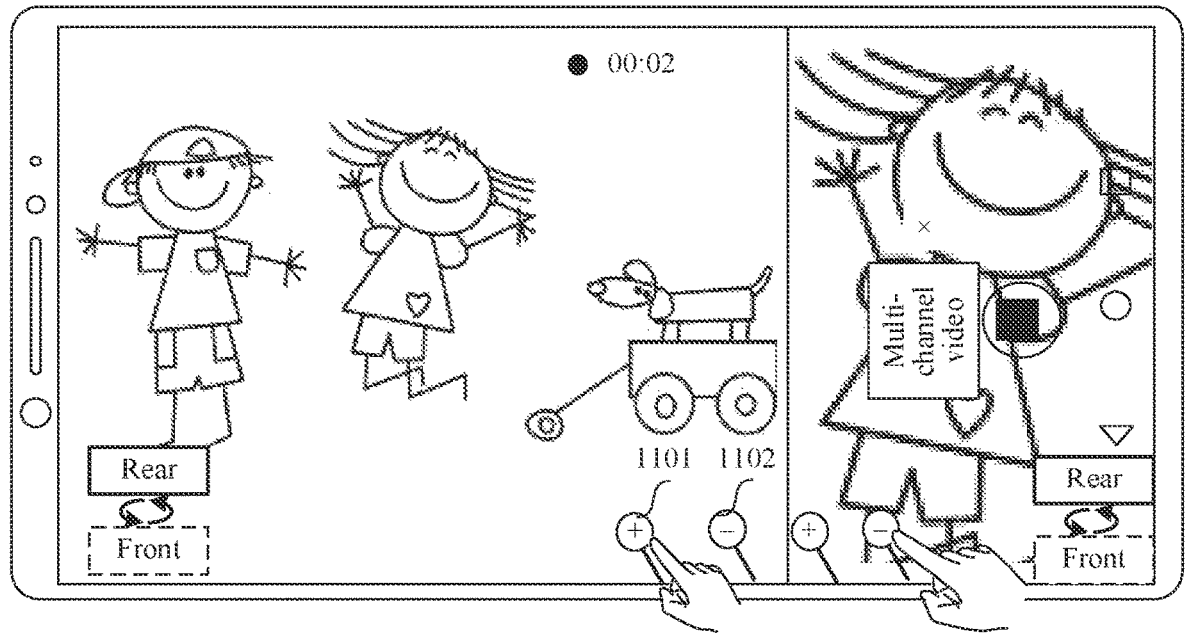
Figures 2, 11A:
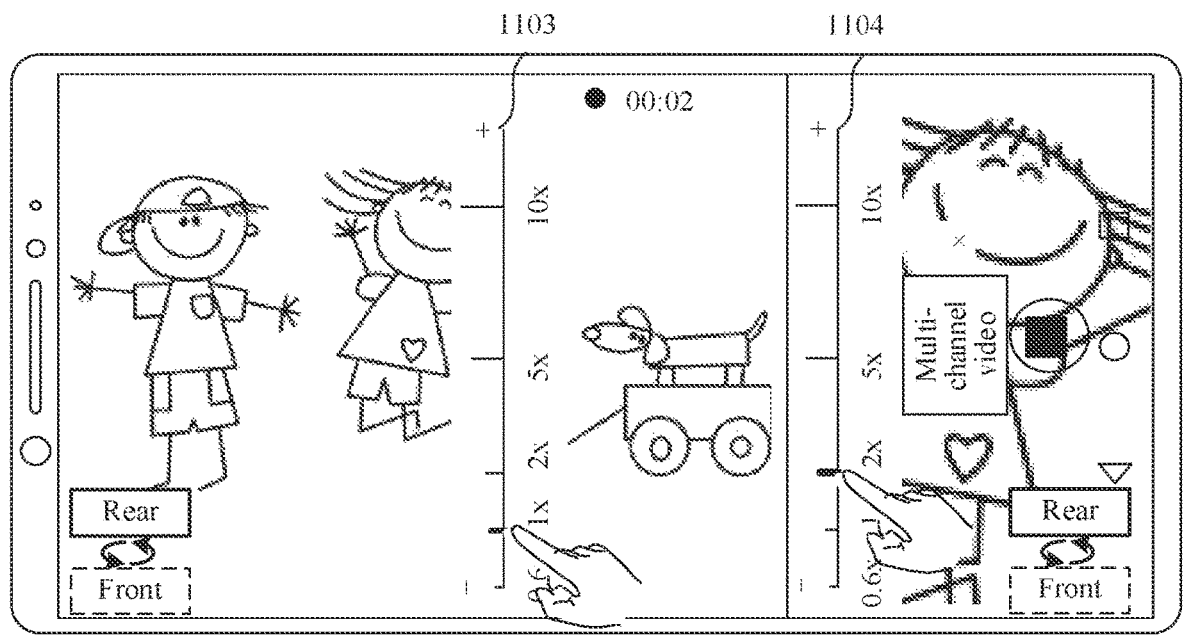
Figures 3, 11A:
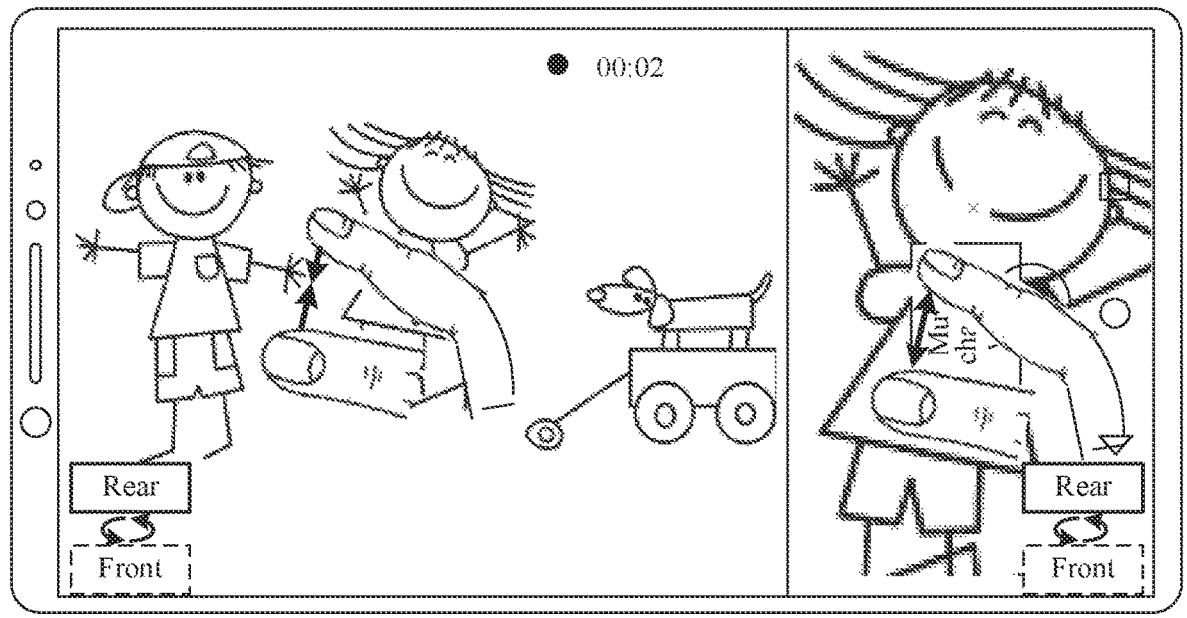

In this embodiment of this application, in a multi-channel video recording process, similar to a manner in which the user adjusts a zoom magnification in a video recording preview interface, as shown in FIG. 11A-1 to FIG. 11A-3, a zoom magnification corresponding to each display area in the shooting interface may be changed according to an indication of the user. That is, the zoom magnification in the first feature value may be changed in real time. The mobile phone may determine, based on a current real-time zoom magnification in the first feature value, the first sound pickup range corresponding to the first display area.

In a case shown in FIG. 11A-1, the first display area includes a zoom adjustment control 1101 used to increase a zoom magnification and a zoom adjustment control 1102 used to decrease a zoom magnification. The user may tap these controls to adjust the zoom magnification corresponding to the first display area. Similarly, the second display area may also include zoom adjustment controls used to increase and decrease a zoom magnification.

In a case shown in FIG. 11A-2, the first display area and the second display area each include a zoom adjustment control 1103 and a zoom adjustment control 1104, and the user may drag on a zoom adjustment control to adjust a zoom magnification.

In a case shown in FIG. 11A-3, the user may adjust zoom magnifications in the first display area and the second display area by performing an operation such as finger pinching.

For example, in a solution 1, each display area and each channel of video image correspond to a set of front and rear cameras with all focal lengths. For example, cameras with all focal lengths include a wide-angle camera and a long-focus camera (an ultra-wide-angle camera may be further included), a focal length range corresponding to the wide-angle camera is [P, Q], and a focal length range corresponding to the long-focus camera is [R, S]. S is greater than Q, and R is less than or equal to Q. In other words, focal length ranges of cameras of different focal lengths may overlap. [P, S] may be referred to as a full focal length range.

TABLE 1

| Display area | Camera |
| --- | --- |
| First display area | Camera 1 (rear wide-angle camera) |
| | Camera 2 (rear long-focus camera) |
| | Camera 3 (front wide-angle camera) |
| | Camera 4 (front long-focus camera) |
| | ... |
| Second display area | Camera 5 (rear wide-angle camera) |
| | Camera 6 (rear long-focus camera) |
| | Camera 7 (front wide-angle camera) |
| | Camera 8 (front long-focus camera) |
| | ... |

In the solution 1, a zoom magnification in each display area may be changed within the full focal length range [P, S]. Full focal length ranges [P, S] corresponding to different display areas may be the same or different. For each display area, the mobile phone may switch a camera corresponding to the display area, to meet a requirement of the user on a zoom magnification.

In an example of the first display area, in a rear camera scenario, when the zoom magnification is switched from a magnification in [P, Q] to a magnification in [Q, S], the first camera may be switched from a rear wide-angle camera (namely, the camera 1) to a rear long-focus camera (namely, the camera 2). When the zoom magnification is switched from a magnification in [R, S] to a magnification in [P, R], the first camera may be switched from a rear long-focus camera (namely, the camera 2) to a rear wide-angle camera (namely, the camera 1). Zoom processing in a front camera scenario is similar to that in the rear camera scenario, and zoom processing in the second display area is similar to that in the first display area. Details are not described herein.

Figures 1, 11B:
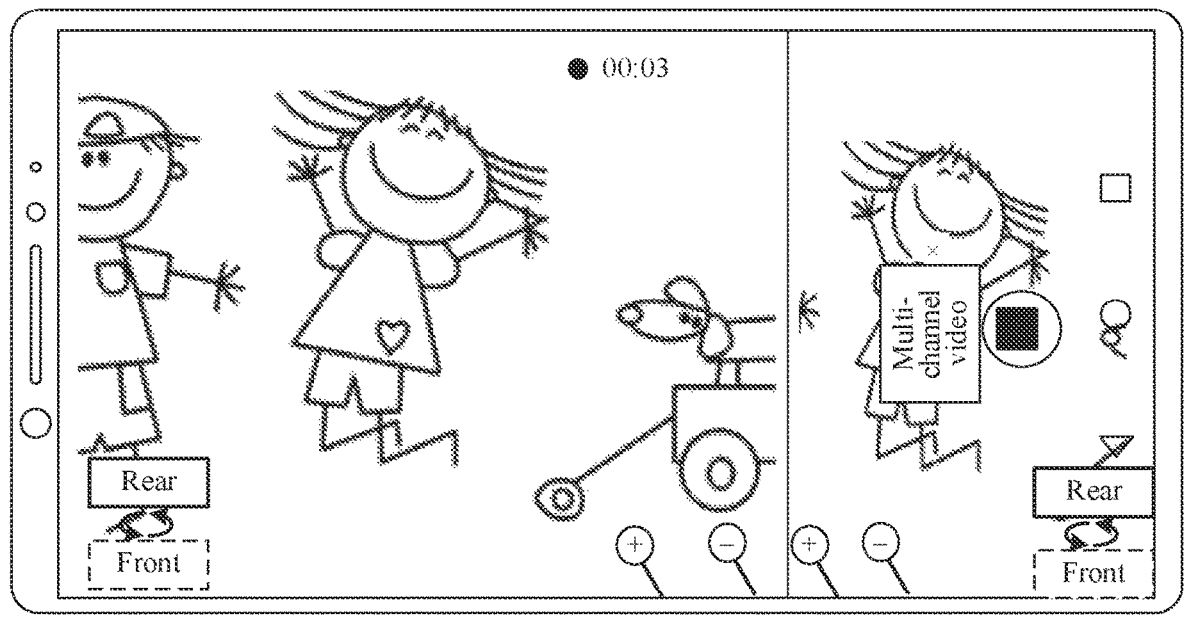
Figures 2, 11B:
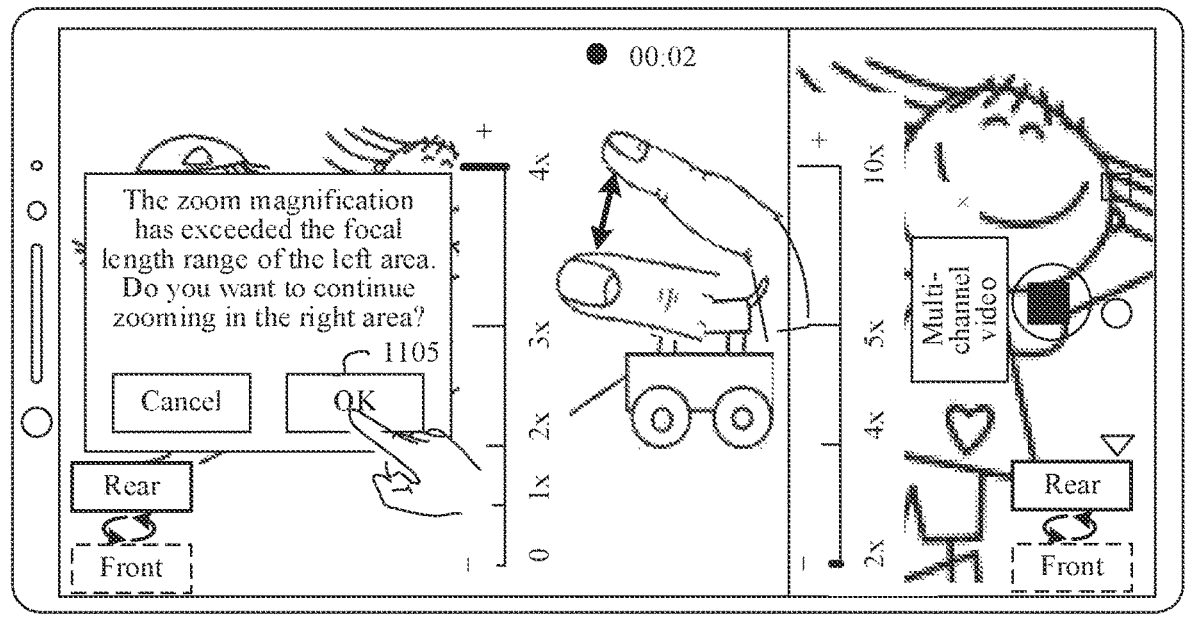
Figures 3, 11B:
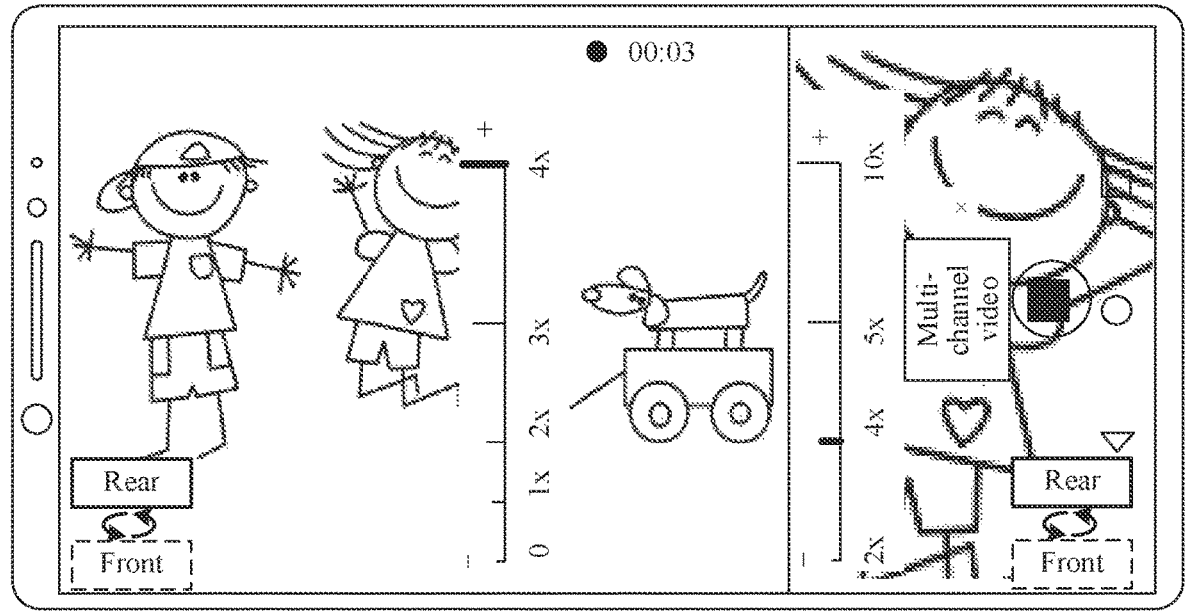

For example, in the scenario shown in FIG. 11A-1, the first camera used for the first display area on the left is a rear wide-angle camera, and after the mobile phone detects an operation performed by the user to increase a zoom magnification, and after the increased zoom magnification exceeds a focal length range of the rear wide-angle camera, the first camera is switched to a rear long-focus camera. As shown in FIG. 11B-1, the image range in the first display area is reduced, and the video image in the first display area is scaled up for displaying. In addition, in the scenario shown in FIG. 11A-1, a second camera used for the second display area on the right is a rear long-focus camera, and after the mobile phone detects an operation performed by the user to decrease a zoom magnification, and after the decreased zoom magnification exceeds a focal length range of the rear long-focus camera, the second camera is switched to a rear wide-angle camera. As shown in FIG. 11B-1, the image range in the second display area is increased, and the video image in the second display area is scaled down for displaying.

Solution 2: The mobile phone includes a plurality of cameras, and all display areas share the plurality of cameras. For example, when the zoom magnification in the first display area indicated by the user is changed in a direction and another camera needs to be used, if the another camera is occupied by the second display area, the first display area cannot use the another camera. The zoom magnification in the first display area cannot continue to be changed in this direction.

For example, as shown in Table 2, the first display area and the second display area may share a camera 1 to a camera 4.

TABLE 2

| Display area | Camera |
| --- | --- |
| First display area | Camera 1 (rear wide-angle camera) |
| Second display area | Camera 2 (rear long-focus camera) |
| | Camera 3 (front wide-angle camera) |
| | Camera 4 (front long-focus camera) |

Solution 3: Each display area corresponds to at least one camera, and a zoom magnification in the display area may be changed within a focal length range of the corresponding camera. For example, when the zoom magnification in the first display area indicated by the user is changed in a direction and a camera corresponding to another display area needs to be used, the first display area cannot use the camera corresponding to the another display area, and the zoom magnification in the first display area cannot continue to be changed in the direction.

For example, as shown in Table 3, the first display area corresponds to a camera 1 and a camera 3, and the second display area corresponds to a camera 2 and a camera 4.

TABLE 3

| Display area | Camera |
| --- | --- |
| First display area | Camera 1 (rear wide-angle camera) |
| | Camera 3 (front wide-angle camera) |
| Second display area | Camera 2 (rear long-focus camera) |
| | Camera 4 (front long-focus camera) |

In the solution 2 and the solution 3, a zoom magnification in a same display area cannot be continuously changed within a full focal length range. The mobile phone can continuously change a zoom magnification within the full focal length range through cooperation of a plurality of display areas. For example, when a zoom magnification indicated by the user in a display area exceeds a focal length range of a camera that can be used for the display area, the mobile phone may prompt the user to switch to another display area to continue zooming.

For example, in a scenario shown in FIG. 11B-2, the first camera used for the first display area on the left is a rear wide-angle camera, and the second camera used for the second display area on the right is a rear long-focus camera. A focal length range of the rear wide-angle camera is [0, 4], and a focal length of the rear long-focus camera is [2, 10]. A current zoom magnification of the first display area is 4. After detecting an operation performed by the user to increase the zoom magnification in the first display area, the mobile phone determines that an increased zoom magnification exceeds the focal length range of the wide-angle camera. In this case, refer to FIG. 11B-2. The mobile phone may prompt the user: The zoom magnification has exceeded the focal length range of the left area. Do you want to continue zooming in the right area? Alternatively, the mobile phone may prompt the user: The zoom magnification has exceeded the focal length range of the left area. Do you want to perform a zoom operation on the zoom adjustment control in the right area? After the mobile phone detects a tapping operation performed by the user on an "OK" control 1105, as shown in FIG. 11B-3, a zoom magnification in the second display area on the right is automatically changed to 4 (or a value greater than 4), and a video image corresponding to the zoom magnification is displayed in the second display area. After the mobile phone detects a tapping operation performed by the user on a "cancel" control, the zoom magnification in the first display area on the left is 4, and the zoom magnification in the second display area on the right is still an original value. In this way, the mobile phone can implement continuous zooming for video recording by a rear camera in the multi-channel video recording process.

For another example, the first camera used for the first display area on the left is a front wide-angle camera, and the second camera used for the second display area on the right is a front long-focus camera. A focal length range of the front wide-angle camera is [0, 4], and a focal length of the front long-focus camera is [2, 10]. A current zoom magnification of the second display area is 2. After detecting an operation performed by the user to decrease the zoom magnification in the second display area, the mobile phone determines that a decreased zoom magnification exceeds the focal length range of the long-focus camera. In this case, the mobile phone may prompt the user: The zoom magnification has exceeded the focal length range of the right area. Continue zooming in the fell area. In addition, the zoom magnification in the second display area on the left is automatically changed to 2 or a value less than 2. In this way, the mobile phone can implement continuous zooming for video recording by a front camera in the multi-channel video recording process.

For another example, in the shooting interface, the first camera used for the first display area on the left is a rear wide-angle camera, and the second camera used for the second display area on the right is a front long-focus camera. A focal length range of the rear wide-angle camera is [0, 4], and a focal length of the front long-focus camera is [2, 10]. A current zoom magnification of the first display area is 4.

After detecting an operation performed by the user to increase the zoom magnification in the first display area, the mobile phone determines that an increased zoom magnification exceeds the focal length range of the rear wide-angle camera. In this case, the mobile phone may prompt the user: The zoom magnification has exceeded the focal length range of the rear wide-angle camera (or a rear wide-angle mode). Do you want to switch to the rear long-focus camera (or a rear long-focus mode) in the left area to continue shooting? After the mobile phone detects that the user indicates to switch to the rear long-focus camera (the rear long-focus mode) in the left area to continue shooting, an image shot by the rear long-focus camera starts to be displayed in the first display area on the left, and the zoom magnification of the rear long-focus camera is automatically changed to 4 (or a value greater than 4). In this way, after switching to another camera in a same display area, the mobile phone does not need to start zooming from a boundary value of a focal length range of the another camera, but may continue zooming from a zoom magnification indicated by the user, to implement continuous zooming and improve user experience. For example, boundary values of the focal length range [2, 10] of the rear long-focus camera are 2 and 10.

In some embodiments of this application, in the shooting interface, each display area may further include a front/rear switching control, used to switch a front/rear video image in the display area in a video recording process. The front/rear attribute parameter in the first feature value may be changed in real time based on a front/rear switching indication of the user. The mobile phone may determine, based on a current real-time front/rear attribute parameter in the first feature value, the first sound pickup range corresponding to the first display area.

Figures 1, 11C:
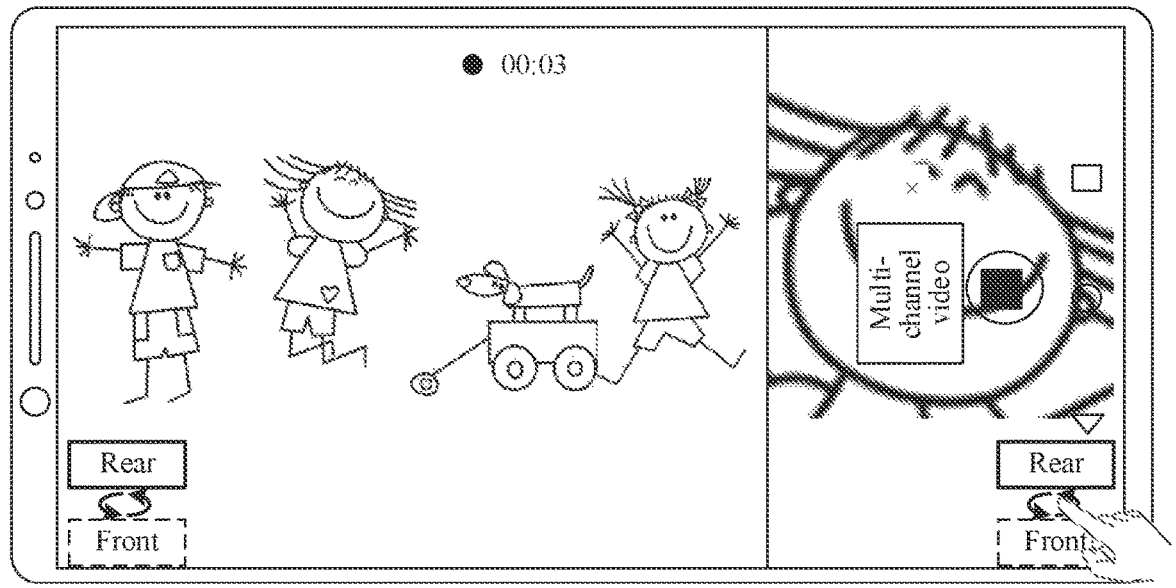
Figures 2, 11C:
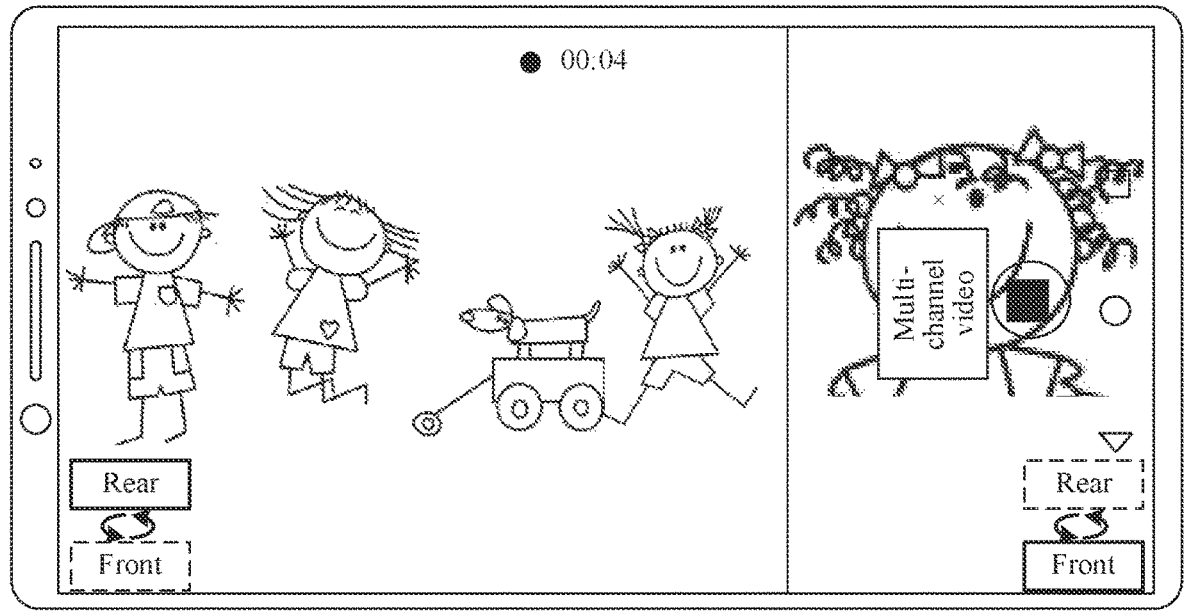

For example, for the shooting interface in the multi-channel video recording mode, refer to FIG. 11C-1. The shooting interface includes the first display area on the left and the second display area on the right. The first display area and the second display area each include a front/rear switching control. After the mobile phone detects a tapping operation performed by the user on a front/rear switching control in the second display area, as shown in FIG. 11C-2, the mobile phone may switch a rear video image in the second display area to a front video image.

In some other embodiments of this application, the shooting interface may further include some mode controls, so that the user can directly switch, by using the mode controls, a camera used for the first display area or the second display area, and directly switch a zoom magnification to a focal length range corresponding to the camera. That is, the mode controls may be convenient for the user to directly switch to a desired target camera and a target focal length range.

Each mode control corresponds to one shooting mode, and the shooting mode may include a rear wide-angle mode, a rear long-focus mode, a front wide-angle mode, or a front long-focus mode. The rear wide-angle mode corresponds to a rear wide-angle camera, the rear long-focus mode corresponds to a rear long-focus camera, the front wide-angle mode corresponds to a front wide-angle camera, and the front long-focus mode corresponds to a front long-focus camera.

In some embodiments, the mode control may also be referred to as a camera switching control, and each camera switching control corresponds to one type of camera. After detecting an operation performed by the user on a camera switching control, the mobile phone captures a video image in a display area by using a target type of camera corresponding to the camera switching control, where a zoom magnification corresponding to the display area falls within a focal length range of the target camera. For example, the target type of camera includes a rear wide-angle camera, a rear long-focus camera, a front wide-angle camera, or a front long-focus camera.

Figures 1, 11D:
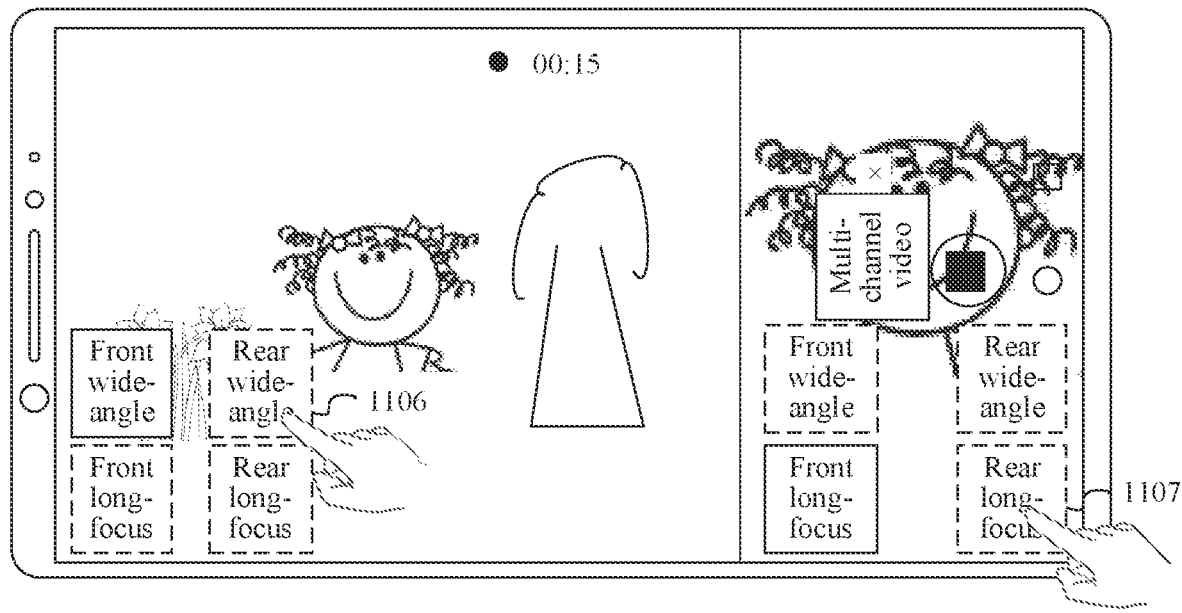
Figures 2, 11D:
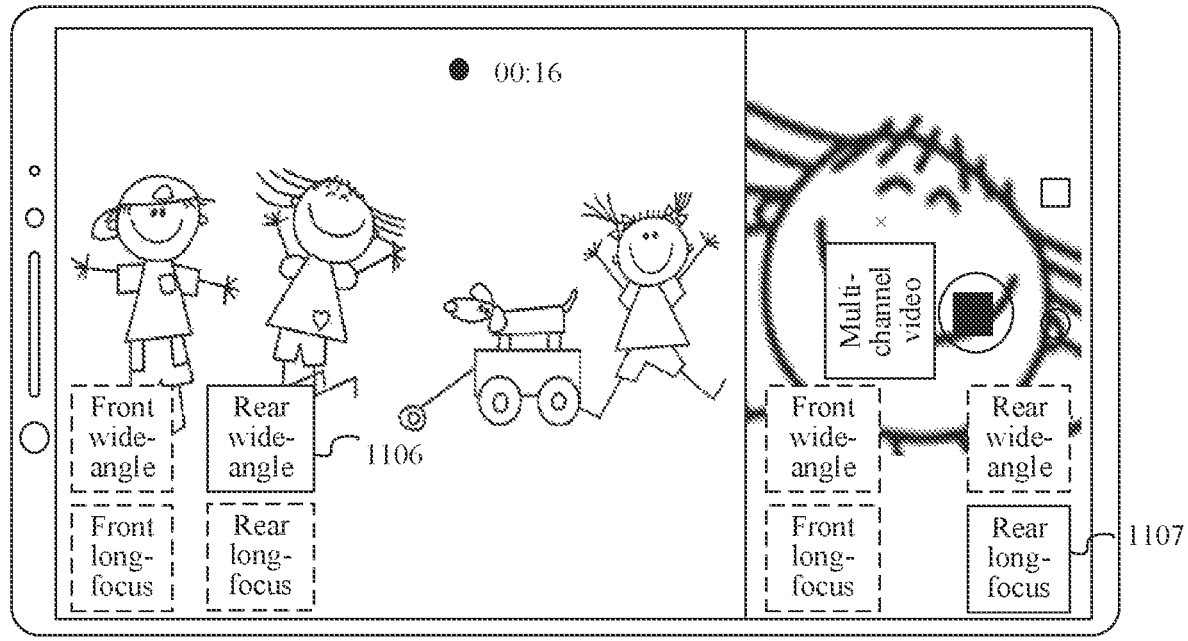

For example, refer to FIG. 11D-1. The first display area and the second display area each include a rear wide-angle control, a rear long-focus control, a front wide-angle control, and a front long-focus control. A front wide-angle control in the first display area is currently selected, and this indicates that the first camera used for the first display area on the left is a front wide-angle camera. A front long-focus control in the second display area is currently selected, and this indicates that the second camera used for the second display area on the right is a front long-focus camera.

If the mobile phone detects a tapping operation performed by the user on a rear wide-angle control 1106 in the first display area shown in FIG. 11D-1, as shown in FIG. 11D-2, the rear wide-angle control 1106 is selected. The mobile phone may switch the first camera used for the first display area to a rear wide-angle camera, to capture a video image by using the rear wide-angle camera, and display the captured video image in the first display area. If the mobile phone detects a tapping operation performed by the user on a rear long-focus control 1107 in the second display area shown in FIG. 11D-1, as shown in FIG. 11D-2, the rear long-focus control 1107 is selected. The mobile phone may switch the second camera to a rear long-focus camera, to capture a video image by using the rear long-focus camera, and display the captured video image in the second display area.

(3) At Least One Channel of Audio Corresponding to the Second Display Area:

Similar to a manner of recording the at least one channel of audio corresponding to the first display area, the mobile phone may record, based on a second feature value and the initial audio data, the at least one channel of audio corresponding to the second display area. Refer to FIG. 7. Step 305 may further include the following steps.

706: The mobile phone obtains the second feature value corresponding to the second display area.

707: The mobile phone determines, based on the second feature value, a second sound pickup range of audio corresponding to the second display area.

For example, when the zoom magnification corresponding to the second display area is X, for the second sound pickup range corresponding to the second display area, refer to FIG. 9 and FIG. 10.

708: The mobile phone records, based on the second sound pickup range and the initial audio data, the at least one channel of audio corresponding to the second display area.

For descriptions of steps 706 to 708, refer to related descriptions of steps 703 to 705. Details are not described herein.

Similarly, the mobile phone may further determine one or more second reference sound pickup ranges based on the second sound pickup range, to record, based on the second reference sound pickup range, one or more channels of audio corresponding to the second display area. The mobile phone generates an audio file of each channel of audio corresponding to the second display area.

For example, in a multi-channel video recording scenario shown in FIG. 6(*c*), panoramic audio recorded by the mobile phone includes sound in all directions, audio corresponding to the first display area 601 includes sound of the objects such as the little boy, the little girl, and the puppy, and audio corresponding to the second display area 602 is mainly sound of the little girl.

In another example, the shooting interface includes a first display area and a second display area. A video image in the first display area includes a playing image of instrumentalists in a concert, and a video image in the second display area includes a playing image of a concertmaster. In this scenario, panoramic audio recorded by the mobile phone includes sound in all directions, audio corresponding to the first display area includes ensemble sound made by musical instruments played by the instrumentalists in the band, and audio corresponding to the second display area mainly includes sound made by the concertmaster.

In still another example, the shooting interface includes a first display area and a second display area. A video image in the first display area includes a playing image of members in a band, and a video image in the second display area includes a playing image of a guitar vocalist. In this scenario, panoramic audio recorded by the mobile phone includes sound in all directions, audio corresponding to the first display area includes playing sound of the members in the band, and audio corresponding to the second display area mainly includes a singing voice of the guitar vocalist and sound made by a guitar.

In some embodiments, the audio recorded by t e mobile phone may further include:

(4) Panoramic Audio+:

In the multi-channel video recording process, if the mobile phone determines that a zoom magnification of a display area is changed, the mobile phone may further replace a subsequent part of the panoramic audio with subsequent corresponding audio of the display area, to generate the panoramic audio+. Refer to FIG. 7. Step 305 may further include the following step.

709: The mobile phone records the panoramic audio+ when a zoom magnification in a display area is changed.

When the user adjusts a zoom magnification in a display area, the user may want to focus on a video image and a sound pickup range that correspond to an adjusted zoom magnification. Therefore, the mobile phone may replace subsequent audio in the panoramic audio with subsequent audio corresponding to the display area, to generate dynamically changing panoramic audio, highlight audio corresponding to the adjusted zoom magnification in the panoramic audio, and enhance audio change experience of the user after zooming.

For example, the shooting interface includes a first display area and a second display area. The mobile phone records panoramic audio, at least one channel of audio corresponding to the first display area, and at least one channel of audio corresponding to the second display area in the multi-channel video recording process. If the mobile phone determines that a zoom magnification corresponding to the first display area is increased after recording for duration from 00:00 to 00:09, the mobile phone displays a scaled-up video image in the first display area based on an increased zoom magnification, to provide the user with visual experience of zooming in by a camera.

For audio, while recording the panoramic audio, the at least one channel of audio corresponding to the first display area, and the at least one channel of audio corresponding to the second display area, the mobile phone may further record the panoramic audio+. The panoramic audio+ includes two parts: an audio part in duration from 00:00 to 00:09 and an audio part after 00:09. The audio part in the duration from 00:00 to 00:09 in the panoramic audio+ is consistent with an audio part in the duration from 00:00 to 00:09 in the panoramic audio, and the audio part after 00:09 in the panoramic audio+ is consistent with an audio part after 00:09 in a channel of audio corresponding to the first display area. In other words, the audio part corresponding to the duration from 00:00 to 00:09 in the panoramic audio and the audio part after 00:09 in the channel of audio corresponding to the first display area may be combined into the panoramic audio+.

In this way, when the panoramic audio+ is played, the user can hear panoramic sound in playing duration from 00:00 to 00:09. After 00:09, corresponding to increment of the zoom magnification corresponding to the first display area by the user, the user may hear sound in a sound pickup range corresponding to the increased zoom magnification in the first display area, to provide the user with dynamic audio experience of approaching sound.

In other words, playing the panoramic audio+ by the mobile phone may implement: The panoramic sound is played by default, and if a zoom magnification is changed, the sound corresponding to a sound pickup range after the zoom magnification is changed may be prominently played, to provide the user with an audio playing experience in which sound is dynamically changed in distance, volume, and range.

In other words, the panoramic audio+ includes audio a for first duration and audio b for second duration. The audio a is the panoramic audio, the audio b includes audio corresponding to a first zoom magnification of the first camera. The first camera performs shooting by using a second zoom magnification in the first duration, and performs shooting by using the first zoom magnification in the second duration.

In this way, the mobile phone may record the panoramic audio, the panoramic audio+, and audio corresponding to each display area, so that the user can subsequently select to play different audio, to improve audio experience of the user during multi-channel video recording.

In addition, the mobile phone may record audio corresponding to each display area, and record audio that matches a video image in each display area in real time, so that audio corresponding to different display areas can be switched and played subsequently, and played audio matches in real time a video image in a display area that the user focuses on, to improve audio experience of the user.

In addition, the mobile phone may record audio corresponding to a feature value such as a zoom magnification or a front/rear attribute parameter that is changed in real time in a display area. Therefore, during video playback, the mobile phone can play the audio corresponding to the feature value such as the zoom magnification or the front/rear attribute parameter that is changed in real time in the display area, so that the audio matches in real time a video image that is changed based on the feature value such as the zoom magnification or the front/rear attribute parameter, to improve audio experience of the user.

In some embodiments of this application, before generating an audio file of each channel of audio, the mobile phone may perform various sound effect processing on each channel of audio, so that recorded audio has higher audio quality and a better audio processing effect. For example, the sound effect processing may include a Dolby sound effect, a Histen sound effect, a sound retrieval system (sound retrieval system, SRS) sound effect, a bass enhanced engine (bass enhanced engine, BBE) sound effect, or a dynamic bass enhanced engine (dynamic bass enhanced engine, DBEE) sound effect.

306: After detecting an operation performed by the user to indicate to stop shooting, the mobile phone stops recording a video image and audio, and generates a multi-channel recorded video.

Figure 8:
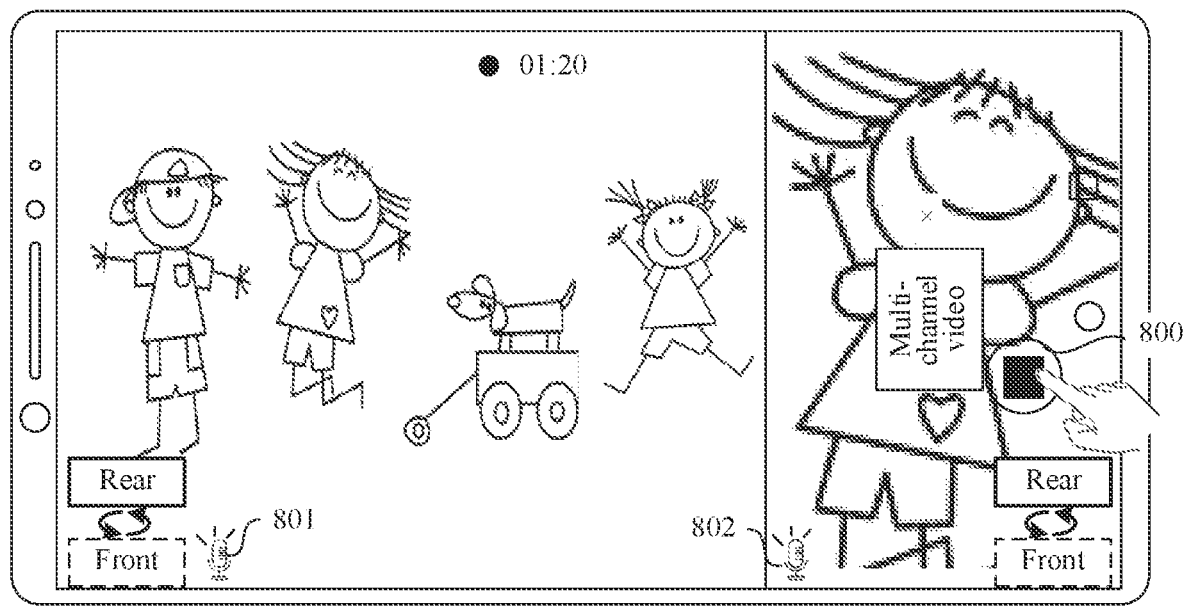
FIG. 8 is a schematic diagram of an interface according to an embodiment of this application.

For example, the operation performed by the user to indicate to stop shooting may be a tapping operation performed by the user on a control 800 shown in FIG. 8, a voice indication operation performed by the user to stop shooting, or another operation such as a gesture. This is not limited in this embodiment of this application.

After detecting the operation performed by the user to indicate to stop shooting, the mobile phone generates a plurality of channels of recorded videos and returns to the video recording preview interface or the shooting preview interface. The multi-channel recorded video includes the plurality of channels of video images and the plurality of channels of audio. For example, for a thumbnail of the multi-channel recorded video generated by the mobile phone, refer to a thumbnail 1201 shown in FIG. 12(*a*), or a thumbnail 1202 shown in FIG. 12(*b*).

In some embodiments, for the multi-channel recorded video recorded by using the method provided in this embodiment of this application, the mobile phone may prompt the user that the video has a plurality of channels of audio. For example, the thumbnail of the multi-channel recorded video or detailed information about the multi-channel recorded video may include prompt information used to indicate the plurality of channels of audio. For example, the prompt information may be a mark 1203 of a plurality of speakers shown in FIG. 12(*b*), a mark in another form, or text information.

Figure 12A:
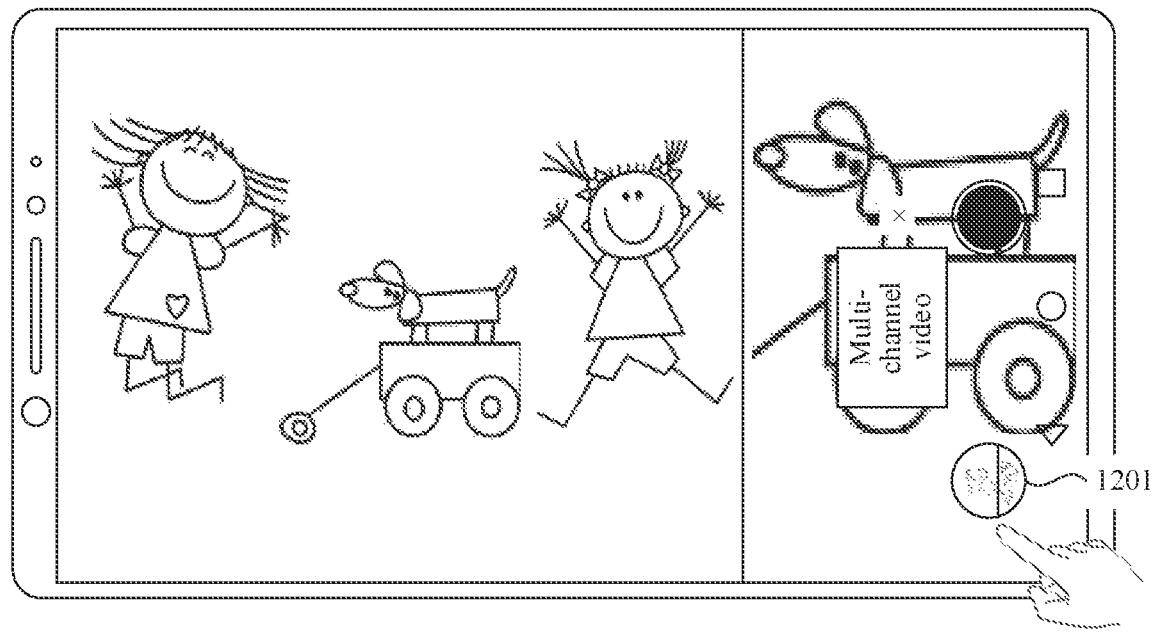
FIG. 12(a) to FIG. 12(c) are schematic diagrams of another group of interfaces according to an embodiment of this application.
Figure 12B:
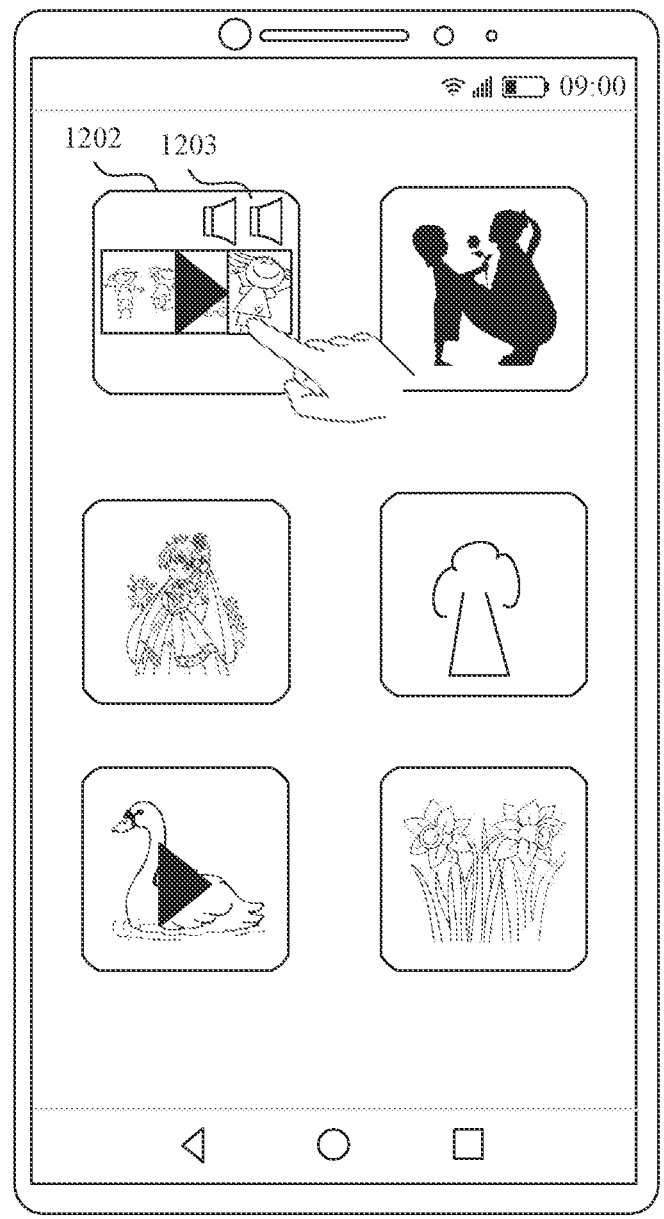

In some other embodiments, the mobile phone may store a video file corresponding to each channel of recorded video. The video file corresponding to each channel of recorded video can also be displayed in the gallery. For example, refer to FIG. 12(*c*). A file indicated by a thumbnail 1204 in the gallery includes files corresponding to all channels of recorded video images and files corresponding to all channels of audio. Refer to FIG. 12(*c*). A file indicated by a thumbnail 1205 in the gallery includes files corresponding to a video image and audio in a wide-angle view corresponding to a channel 1. A file indicated by a thumbnail 1206 in the gallery includes files corresponding to a video image and audio in a wide-angle view corresponding to a channel 2.

307: After detecting an operation performed by the user to indicate to play the multi-channel recorded video, the mobile phone plays a video image and audio of the multi-channel recorded video.

For example, the operation performed by the user to indicate to play the multi-channel recorded video may be a tapping operation performed by the user on the thumbnail 1201 in a video recording preview interface shown in FIG. 12 (*a*). For another example, the operation performed by the user to indicate to play the multi-channel recorded video may be a tapping operation performed by the user on the thumbnail 1202 in the gallery shown in FIG. 12 (*b*).

After detecting the operation performed by the user to indicate to play the multi-channel recorded video, the mobile phone plays the multi-channel recorded video based on the plurality of channels of video images and the plurality of channels of audio that are recorded in the multi-channel video recording process. That is, during video playback, the mobile phone plays the video images and the audio that are recorded in the multi-channel video recording process.

During video playback, the mobile phone may display a video playback interface. In some embodiments, the video playback interface may include the channels of video images. That is, the mobile phone may play the channels of video images. For audio playing, in some technical solutions, during video playback, the mobile phone may play the panoramic audio by default, and then may play other audio according to an indication of the user.

For example, during video playback, the video playback interface may include a plurality of audio switching controls, and each audio switching control corresponds to one channel of audio recorded in the multi-channel video recording process. After detecting a tapping operation performed by the user on an audio switching control, the mobile phone plays a channel of audio corresponding to the audio switching control.

Figure 13A:
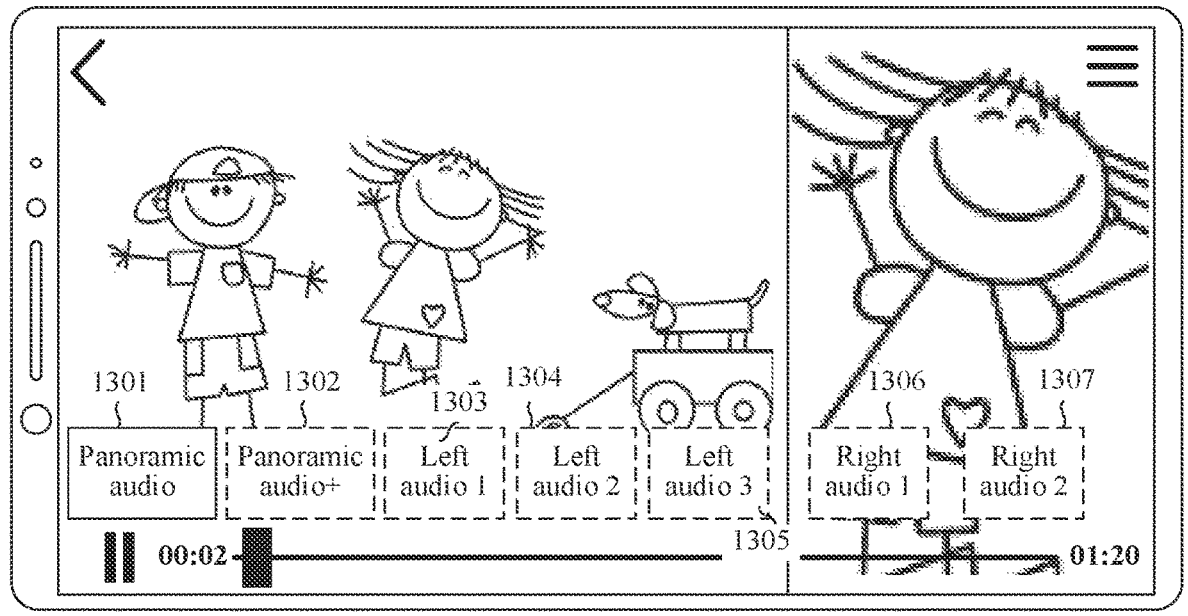
FIG. 13(a) and FIG. 13(b) are schematic diagrams of another group of interfaces according to an embodiment of this application.
Figure 13B:
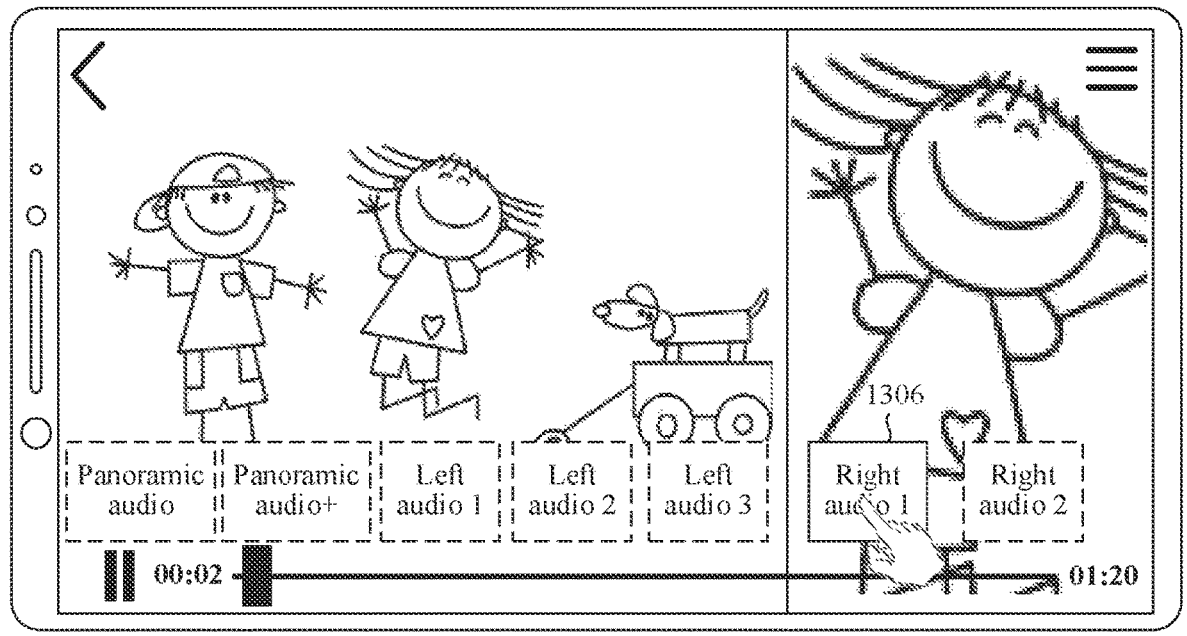

For example, during video playback, the mobile phone may display a video playback interface shown in FIG. 13(*a*). The video playback interface includes a video image 1 (which may be referred to as a left video image) in a first display area on the left and a video image 2 (which may be referred to as a right video image) in a second display area on the right. The video playback interface may further include audio switching controls 1301 to 1307. As shown in FIG. 13(*a*), the audio switching control 1301 is currently selected, and the mobile phone plays the panoramic audio by default. Refer to FIG. 13(*b*). After detecting a tapping operation performed by the user on the audio switching control 1306, the mobile phone may play right audio 1 corresponding to the audio switching control 1306, namely, audio 1 corresponding to the second display area. The right audio 1 is sound of the little girl in the second display area.

Figure 14:
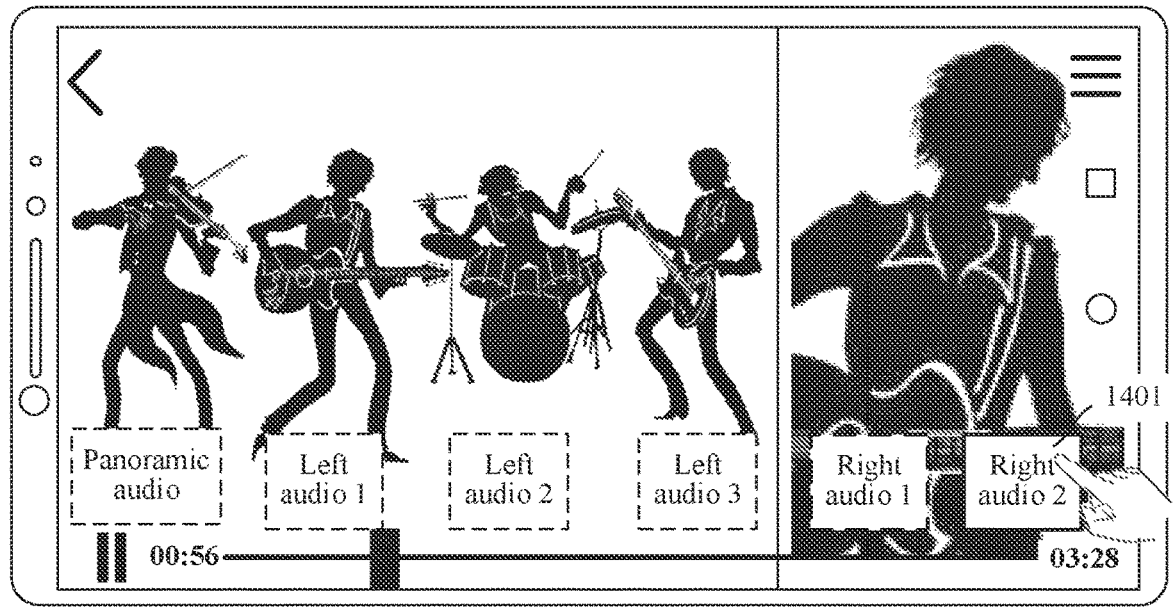
FIG. 14 is a schematic diagram of another interface according to an embodiment of this application.

For another example, during video playback, the mobile phone may display a video playback interface shown in FIG. 14. The video playback interface includes a left video image in a first display area on the left and a right video image in a second display area on the right. The video playback interface may further include a plurality of audio switching controls. After detecting a tapping operation performed by the user on an audio switching control 1401, the mobile phone may play right audio 2 corresponding to the audio switching control 1401, namely, audio 2 corresponding to the second display area. The right audio 2 is a singing voice of the guitar vocalist and sound made by the guitar in the second display area.

For example, during video playback, the video playback interface may include a preset control used to call up an audio switching control. After detecting a tapping operation performed by the user on the preset control, the mobile phone may display a plurality of audio switching controls shown in FIG. 13(*a*), FIG. 13(*b*), FIG. 14, or the like. After detecting a tapping operation performed by the user on an audio switching control, the mobile phone plays a channel of audio corresponding to the audio switching control.

In some other technical solutions, during video playback, the mobile phone may display a video playback interface, and does not play audio. After detecting an indication operation of the user, the mobile phone plays audio indicated by the user.

In some other embodiments, during video playback, the mobile phone may play only one channel of video image in one display area. For example, during video playback, the mobile phone displays all the channels of video images in all the display areas by default, and plays the panoramic audio by default. After detecting an operation performed by the user to indicate to display only one channel of video image in a display area, the mobile phone may display only the channel of video image. For example, the mobile phone may display the video image in a scaling up manner or in full screen, and automatically play a channel of audio corresponding to the video image. The channel of audio automatically played by the mobile phone may be a channel of video randomly selected by the mobile phone from a plurality of channels of audio corresponding to the display area. Alternatively, the mobile phone may sort the plurality of channels of audio corresponding to the display area based on audio quality, and the channel of audio automatically played by the mobile phone is a channel of audio with best audio quality. Then, when the mobile phone detects that the user indicates another channel of audio corresponding to the display area, the mobile phone plays the channel of audio indicated by the user.

Figure 15A:
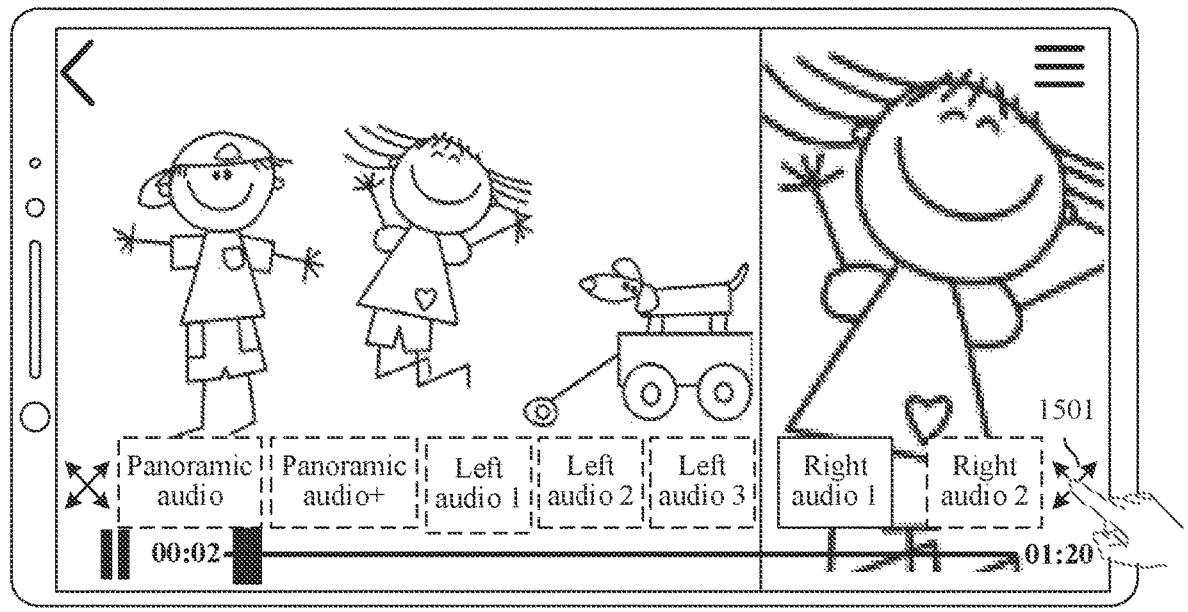
FIG. 15(a) and FIG. 15(b) are schematic diagrams of another group of interfaces according to an embodiment of this application.
Figure 15B:
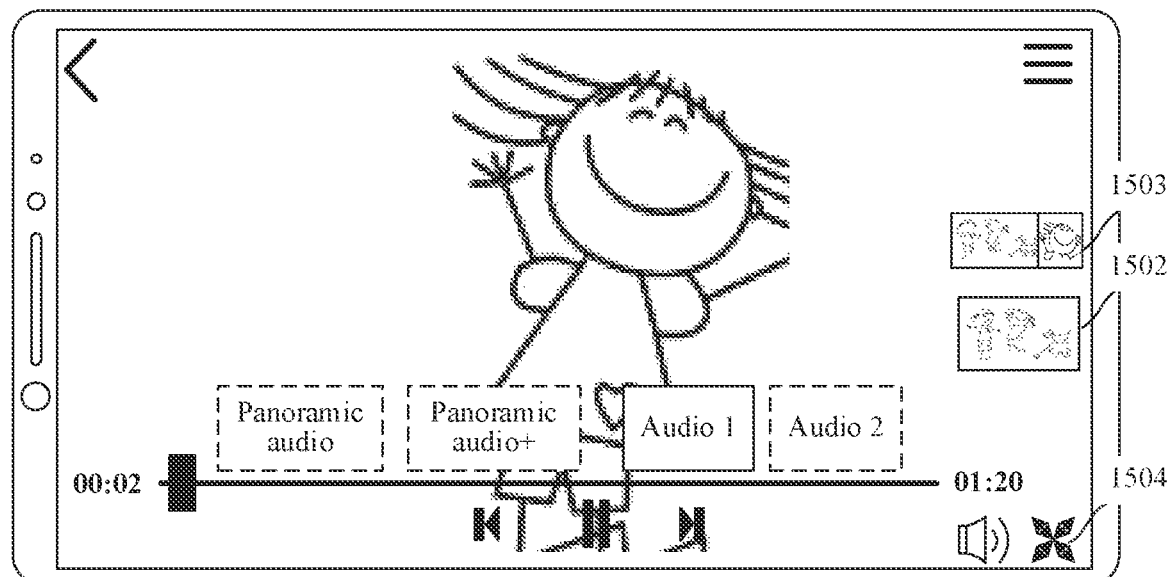

For example, refer to FIG. 15(a). During video playback, the mobile phone plays all the channels of video images and right audio 1. After the mobile phone detects a tapping operation performed by the user on a full screen control 1501 in the second display area on the right, as shown in FIG. 15(b), the mobile phone displays a right video image corresponding to the second display area in full screen, and automatically plays a channel of audio corresponding to the right video image. Subsequently, after detecting a tapping operation performed by the user on a control 1502, the mobile phone may play a left video image in the first display area in full screen and play a channel of audio corresponding to the first display area. Alternatively, after detecting a tapping operation performed by the user on a control 1503 or a control 1504, the mobile phone may resume displaying the plurality of channels of video images shown in FIG. 15(a), and automatically play the panoramic audio.

In the solution described in the foregoing embodiment, during video playback, the mobile phone can switch and play the panoramic audio, the panoramic audio+, or audio corresponding to different display areas, to provide the user with a plurality of audio playing options. In this way, audio can be adjusted, and audio experience of the user during multi-channel video recording is improved.

In addition, the mobile phone can play audio corresponding to different display areas, so that the played audio matches in real time a video image in a display area that the user focuses on, to improve audio experience of the user.

In addition, the mobile phone can play audio corresponding to the feature value such as the zoom magnification or the front/rear attribute parameter that is changed in real time in the display area, so that the audio matches in real time a video image that is changed based on the feature value such as the zoom magnification or the front/rear attribute parameter, to improve audio experience of the user.

Figure 12C:
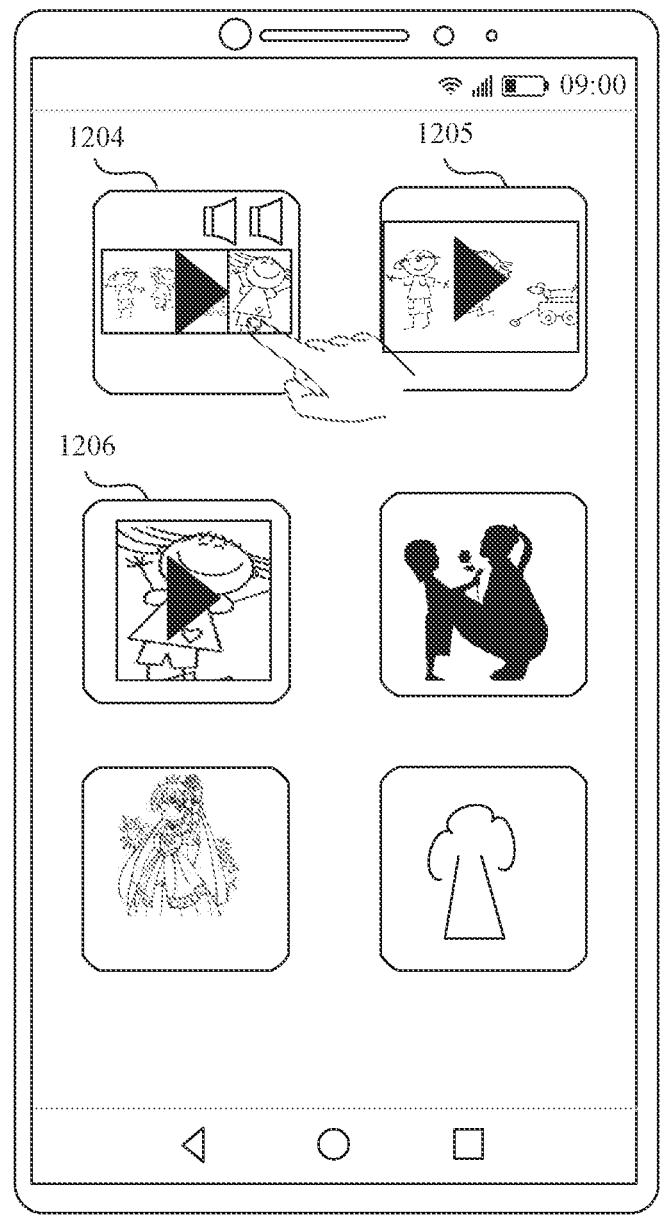

In addition, after detecting a tapping operation performed by the user on the thumbnail 1205 shown in FIG. 12(c), the mobile phone may play a single channel of video image and a channel of audio that correspond to the first display area shown in FIG. 13(a). After detecting a tapping operation performed by the user on the thumbnail 1206 shown in FIG. 12(c), the mobile phone may play a single channel of video image and a channel of audio that correspond to the second display area shown in FIG. 13(a), and the played video image may be shown in FIG. 15(b).

It may be understood that, to implement the foregoing functions, the electronic device includes a corresponding hardware structure and/or software module for performing each function. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that, in the embodiments, division into modules is an example, and is merely logical function division. During actual implementation, there may be another division manner.

Figure 16:
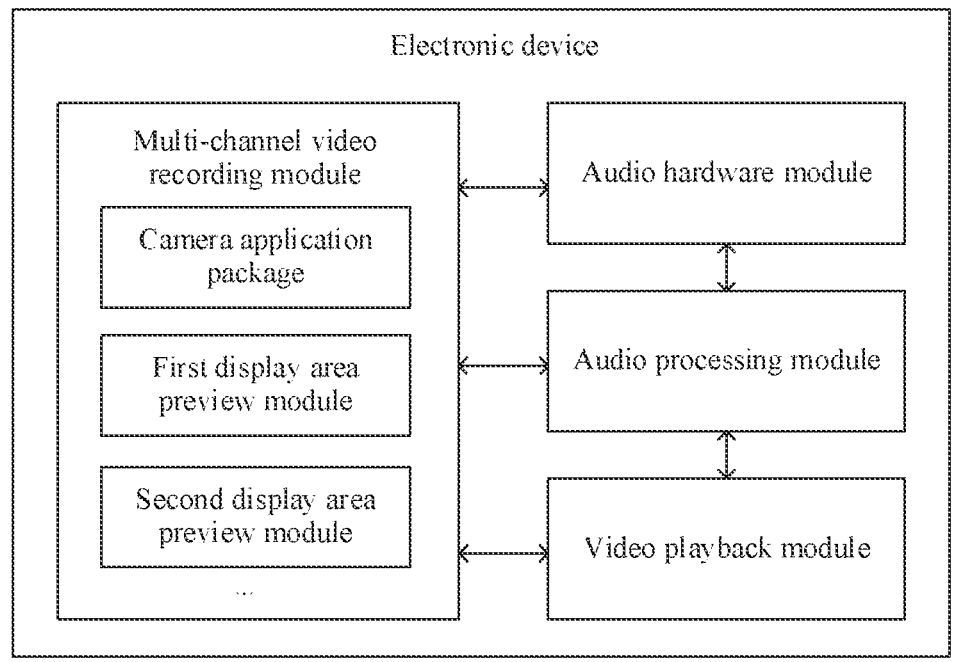
FIG. 16 is a schematic diagram of a structure of another electronic device according to an embodiment of this application.

For example, in a division manner, as shown in FIG. 16, the electronic device may include a multi-channel video recording module, an audio hardware module, an audio processing module, a video playback module, and the like. The multi-channel video recording module may include a camera application package (for example, a camera Android application package (Android application package, APK)), a first display area preview module, a second display area preview module, another display area preview module, and the like. The audio hardware module may include components such as a microphone and an analog-to-digital conversion circuit.

The following describes the audio processing method provided in the embodiments of this application from a perspective of modules of the electronic device shown in FIG. 16. It may be understood that operations and functions performed by the modules of the electronic device are operations and functions performed by the electronic device. For an audio processing procedure based on the modules, refer to FIG. 17A to FIG. 17C. For a schematic diagram of an interaction relationship between the modules, refer to FIG. 18.

Figure 17A:
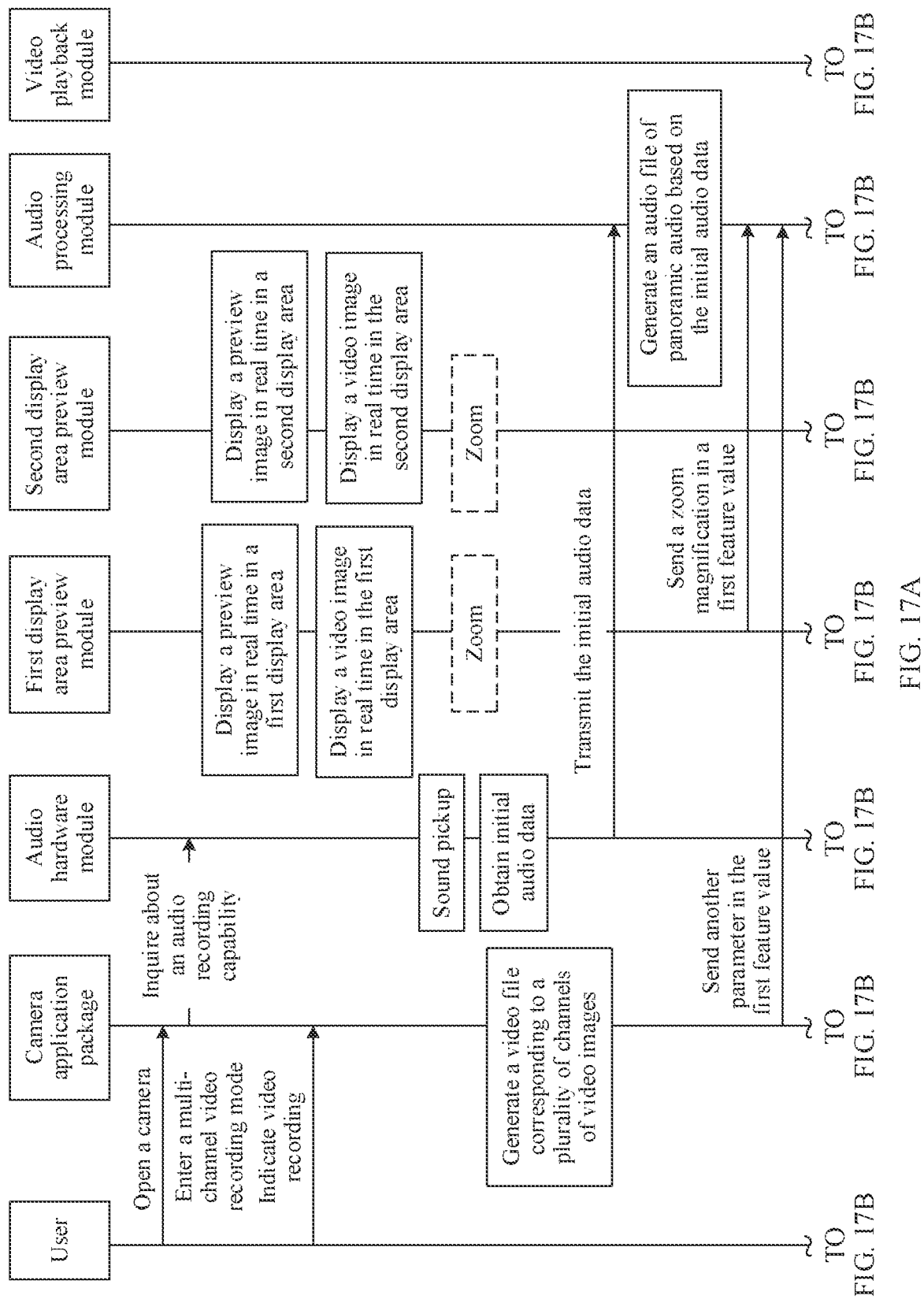
Figure 17C:
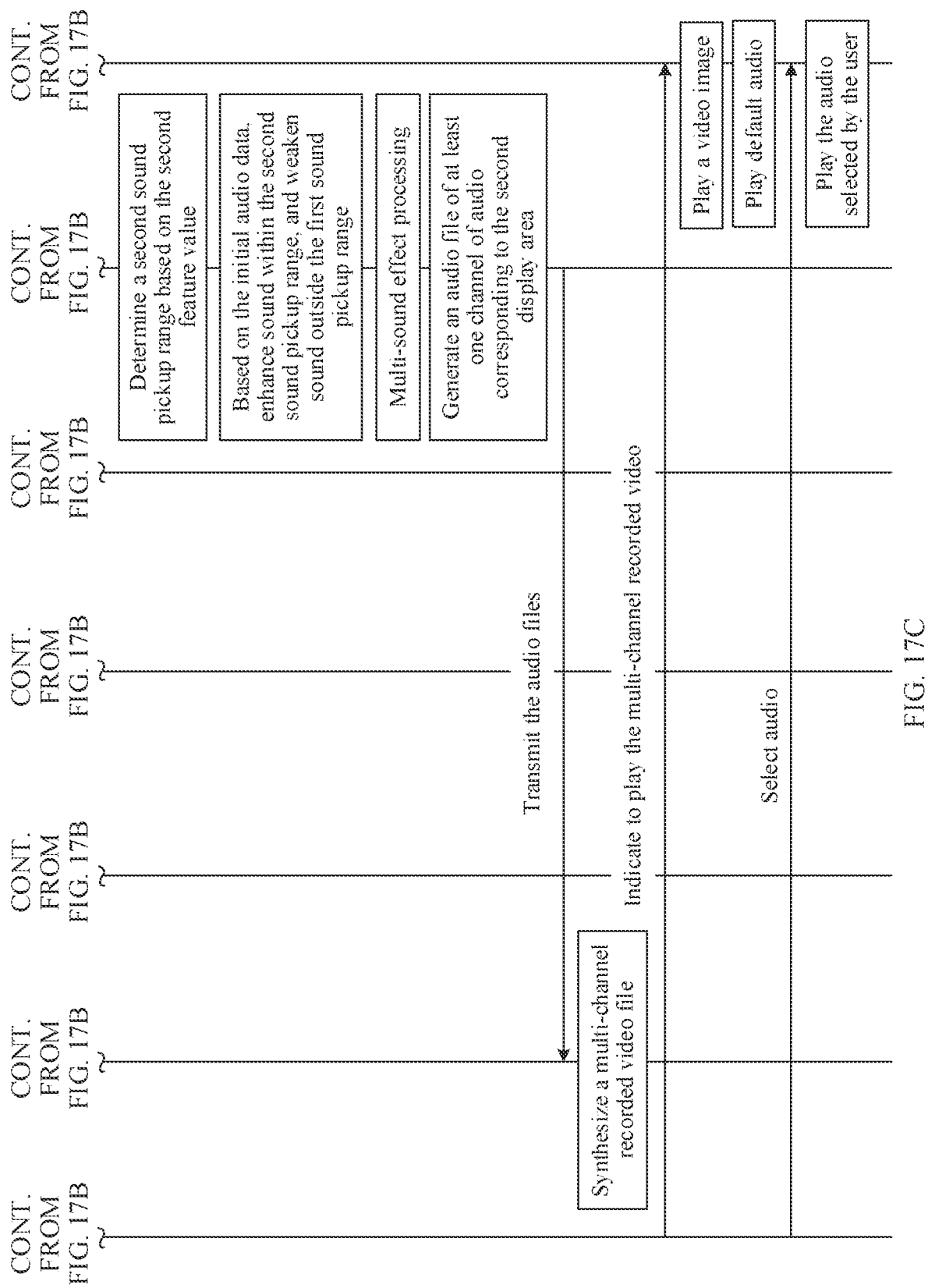
Figure 18:
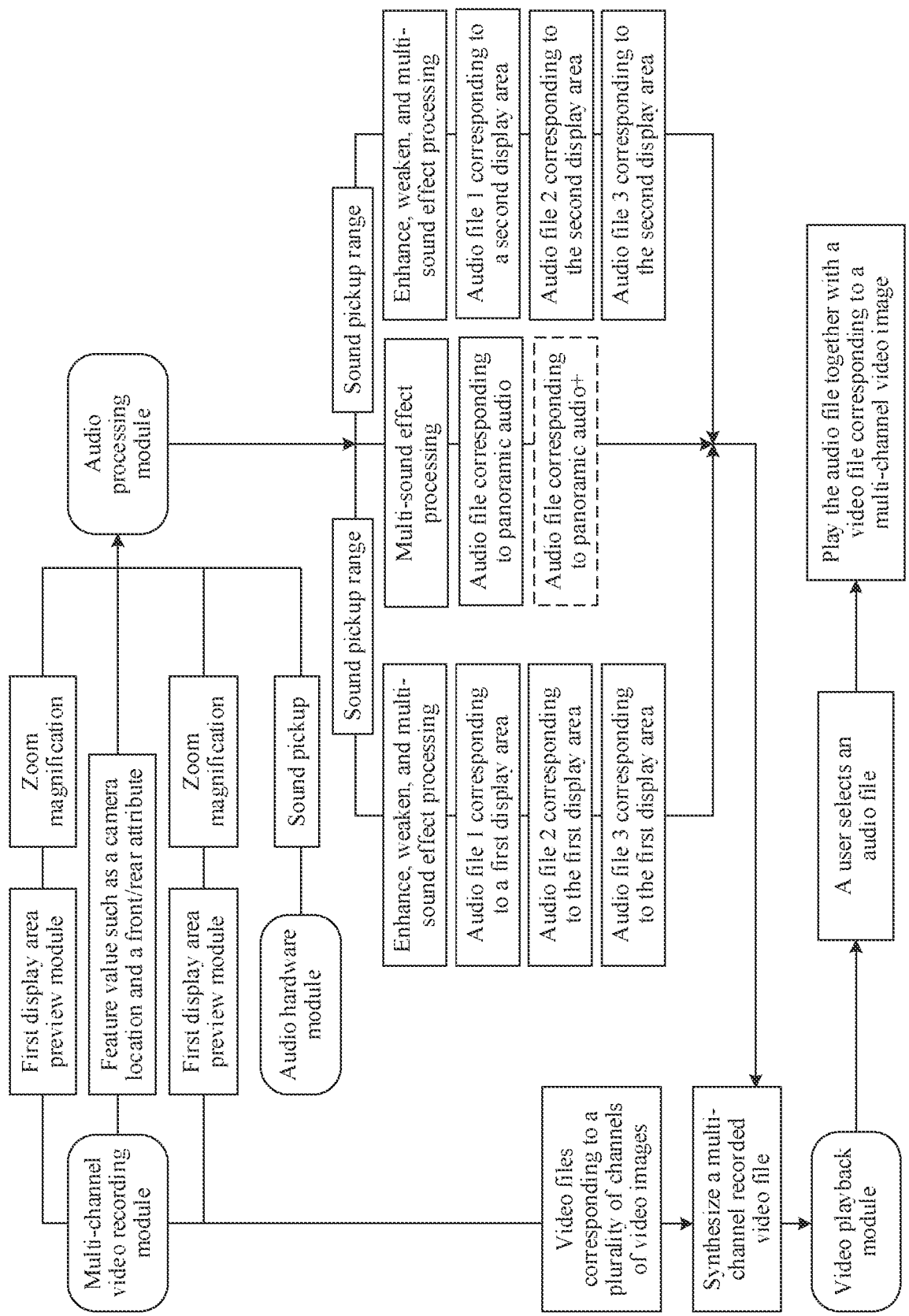
FIG. 18 is a diagram of interaction relationships between modules in an electronic device according to an embodiment of this application.

Refer to FIG. 17A to FIG. 17C. The method may include: After a user indicates to open a camera, the camera application package starts a camera application. Then, after the user indicates to enter a multi-channel video recording mode, the camera application package enters the multi-channel video recording mode. After the multi-channel video recording mode is entered, the first display area preview module may display a preview image in real time in a first display area, and the second display area preview module may display a preview image in real time in a second display area. In addition, after entering the multi-channel video recording mode, the camera application package may further inquire about a capability of a microphone, to determine whether the electronic device has a capability of recording a plurality of channels of audio.

Refer to FIG. 17A to FIG. 17C. The method may further include: After the user indicates to start video recording, the first display area preview module may display a video image in a video recording process in real time in the first display area, and the second display area preview module may display a video image in the video recording process in real time in the second display area. The camera application package generates a video file corresponding to a plurality of channels of video images. In addition, in a video recording process, a zoom magnification corresponding to the first display area and/or the second display area may be further changed (namely, zooming).

Refer to FIG. 17A to FIG. 17C. The method may further include: After the user indicates to start video recording, the microphone in the audio hardware module may capture sound signals (namely, sound pickup) in all directions around, and convert the sound signals into analog audio electrical signals. The analog-to-digital conversion circuit in the audio hardware module may convert the analog audio electrical signals into initial audio data. The audio hardware module may send the initial audio data to the audio processing module. The audio processing module generates an audio file of panoramic audio based on the initial audio data.

Refer to FIG. 17A to FIG. 17C. The method may further include: The first preview module may send, to the audio processing module, a zoom magnification in a first feature value corresponding to the first display area. The camera application package may send another parameter in the first feature value to the audio processing module. The audio processing module determines a first sound pickup range based on the first feature value, enhances sound within the first sound pickup range based on the initial audio data, and weakens sound outside the first sound pickup range based on the initial audio data. In addition, the audio processing module may further determine one or more first reference sound pickup ranges based on the first sound pickup range, enhance sound within the first reference sound pickup range based on the initial audio data, and weaken sound outside the first reference sound pickup range based on the initial audio data. The audio processing module may further perform multi-sound effect processing on obtained audio data. Then, the audio processing module may generate an audio file of at least one channel of audio corresponding to the first display area.

Similarly, the second preview module may send, to the audio processing module, a zoom magnification in a second feature value corresponding to the second display area. The camera application package may send another parameter in the second feature value to the audio processing module. The audio processing module determines a second sound pickup range based on the second feature value, enhances sound within the second sound pickup range based on the initial audio data, and weakens sound outside the second sound pickup range based on the initial audio data. In addition, the audio processing module may further determine one or more second reference sound pickup ranges based on the second sound pickup range, enhance sound within the second reference sound pickup range based on the initial audio data, and weaken sound outside the second reference sound pickup range based on the initial audio data. The audio processing module may further perform multi-sound effect processing on obtained audio data. Then, the audio processing module may generate an audio file of at least one channel of audio corresponding to the second display area.

In addition, when the zoom magnification in the first display area or the second display area is changed, the audio processing module may further generate panoramic audio+.

The audio processing module may send the generated audio files of the plurality of channels of audio to the camera application package.

In this way, the electronic device may record the panoramic audio, the panoramic audio+, and audio corresponding to each display area, so that the user can subsequently select to play different audio, to improve audio experience of the user during multi-channel video recording.

In addition, the electronic device may record audio corresponding to each display area, and record audio that matches a video image in each display area in real time, so that audio corresponding to different display areas can be switched and played subsequently, and played audio matches in real time a video image in a display area that the user focuses on, to improve audio experience of the user.

In addition, the electronic device may record audio corresponding to a feature value such as a zoom magnification or a front/rear attribute parameter that is changed in real time in a display area. Therefore, during video playback, the electronic device can play audio corresponding to the feature value such as the zoom magnification or the front/rear attribute parameter that is changed in real time in the display area, so that the audio matches in real time a video image that is changed based on the feature value such as the zoom magnification or the front/rear attribute parameter, to improve audio experience of the user.

Refer to FIG. 17A to FIG. 17C. The method may further include: The camera application package combines video files corresponding to the plurality of channels of video images and audio files of the plurality of channels of audio into a multi-channel recorded video file. After the user indicates to play the multi-channel recorded video, the video playback module may play a video image and default audio. After the user selects audio, the video playback module may play a video selected by the user.

In this way, during video playback, the electronic device can switch and play the panoramic audio, the panoramic audio+, or audio corresponding to different display areas, to provide the user with a plurality of audio playing options. In this way, audio can be adjusted, and audio experience of the user during multi-channel video recording is improved.

In addition, the electronic device can play audio corresponding to different display areas, so that the played audio matches in real time a video image in a display area that the user focuses on, to improve audio experience of the user.

In addition, the electronic device can switch and play audio corresponding to the feature value such as the zoom magnification or the front/rear attribute parameter that is changed in real time in the display area, so that the audio matches in real time a video image that is changed based on the feature value such as the zoom magnification or the front/rear attribute parameter, to improve audio experience of the user.

In some other embodiments, the microphone in the audio hardware module may be rotated, and the electronic device may adjust a sound pickup direction by rotating the microphone, and determine a sound pickup range by using the audio processing module. In this case, audio corresponding to a display area may be picked up by using only some microphones of the electronic device, instead of all microphones of the electronic device.

In some other embodiments, the electronic device may include more than three microphones, so that sound can be captured for more directions and more area ranges, and a sound pickup range is more accurate. In this way, sound with better sound quality of different sound pickup ranges are subsequently generated. In addition, when the electronic device includes more than three microphones, for different types of audio (for example, the panoramic audio, or the audio corresponding to different display areas), the electronic device can pick up sound in a corresponding range by using a combination of different microphones.

Figure 19:
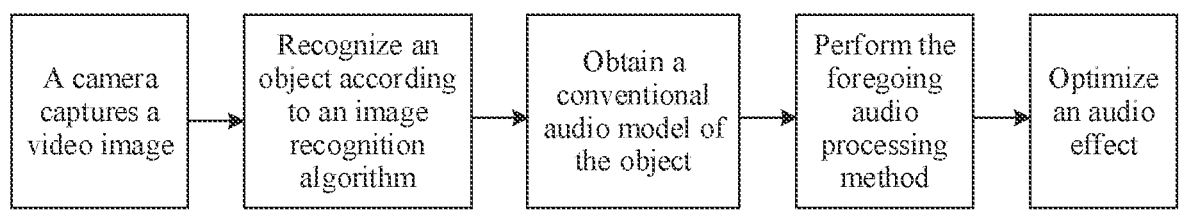
FIG. 19 is a flowchart of another audio processing method according to an embodiment of this application.

In some other embodiments, the audio processing method provided in the embodiments of this application may alternatively be combined with an image recognition algorithm. For a recognized object, the electronic device may perform further processing based on a conventional audio feature and a conventional audio model of the object, to enhance an audio effect. Refer to FIG. 19. The solution may roughly include: A camera captures a video image, an object is recognized according to the image recognition algorithm, and a conventional audio model of the object (for example, an instrument, natural scenery (rain, wind, and thunder), and animal sound) is obtained. Then, the audio processing method in the foregoing embodiments of this application is performed, and then an audio effect is optimized.

For example, according to the image recognition algorithm, the electronic device may recognize an object in the video image and recognize sound of the object, so that the sound of the object recognized in the sound captured by the microphone may be retained, other sound may be suppressed, and audio optimization processing and the like may be performed. For example, in the band playing scenario shown in FIG. 14, for the second display area on the right, the mobile phone may recognize that objects in the video image include a guitarist and a guitar. Therefore, the mobile phone may recognize, from sound signals in the second pickup range corresponding to the second display area, the guitarist's singing voice and the guitar's sound, retain the guitarist's singing voice and the guitar's sound, and suppress other sound. In addition, if the guitarist's singing voice and the guitar's sound that are retained by the mobile phone are distorted or incomplete, the mobile phone may further perform optimization processing based on a human voice model and a guitar sound model.

The image algorithm has a precision problem, and a conventional audio model may be relatively practical for a fixed device, but has a poor effect on abnormal generated irregular sound, and the abnormal generated irregular sound cannot match a fixed audio model. Therefore, to prevent distortion, an audio segment that cannot be processed is not processed and can be recognized according to a precise fixed audio model recognition algorithm, to enhance noise reduction optimization. Sound that is not recognized is not processed, and original sound is retained. This solution can bring better audio-visual experience to the user.

In some other embodiments, in a conventional video recording mode (namely, a single-channel video recording mode), when recording a video image, the electronic device may further record audio corresponding to a feature value such as a zoom magnification that is changed in real time. During video playback, the electronic device may play a video image and audio that match the feature value such as a zoom magnification in real time. In this way, audio recorded by the electronic device matches in real time a video image in a shooting range that the user focuses on, so that audio experience of the user can be improved. Alternatively, the electronic device may record panoramic audio and audio that corresponds to a feature value such as a zoom magnification that is changed in real time. Alternatively, the electronic device may record panoramic audio, panoramic audio+, and audio that corresponds to a feature value such as a zoom magnification that is changed in real time. During video playback, the user can switch and display different audio to improve audio playing experience.

The embodiments of this application further provide an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the audio processing method in the foregoing embodiment.

The embodiments of this application further provide a computer-readable storage medium. The computer-readable storage medium stores computer instructions. When the computer instructions are run on an electronic device, the electronic device is enabled to perform the related method steps, to implement the audio processing method in the foregoing embodiment.

The embodiments of this application further provide a computer program product. When the computer program product is run on a computer, the computer is enabled to perform the foregoing related steps, to implement the audio processing method performed by the electronic device in the foregoing embodiment.

In addition, the embodiments of this application further provide an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the audio processing method performed by the electronic device in the foregoing method embodiment.

The electronic device, the computer-readable storage medium, the computer program product, or the chip provided in the embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for convenient and brief description, division into the foregoing function modules is taken as an example for illustration. In actual application, the foregoing functions can be allocated to different modules and implemented according to a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely an example. For example, the division into the modules or units is merely logical function division, and there may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed at different places. Some or all of the units may be selected based on an actual requirement to achieve an objective of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio processing method implemented by an electronic device, wherein the audio processing method comprises:
   detecting, from a user, a first operation to open a camera application;
   displaying, in response to the first operation, a shooting preview interface;
   entering into a multi-channel video recording mode;
   detecting a shooting operation of the user;
   displaying, in response to the shooting operation, a shooting interface comprising a first display area and a second display area, wherein the first display area displays a first video image captured by a first camera of the electronic device, and wherein the second display area displays a second video image captured by a second camera of the electronic device;
   simultaneously recording, in the multi-channel video recording mode, the first video image using the first camera and the second video image using the second camera;
   recording, in the multi-channel video recording mode, first audio of a plurality of sound channels, wherein the first audio comprises a panoramic audio and a third audio corresponding to the second video image;
   recording, in the multi-channel video recording mode, a second audio corresponding to the first video image based on a feature value corresponding to the first display area, wherein the feature value comprises a first zoom magnification of the first camera and a distance between the first camera and a frame of the electronic device, and wherein the first audio further comprises the second audio;
   recognizing an object in the first or second video;
   recognizing sound associated with the object; and
   suppressing, from at least one of the first, second, or third audios, sound other than the sound associated with the object.

2. The audio processing method of claim 1, wherein the feature value further comprises a front/rear attribute parameter corresponding to the first display area, and wherein the front/rear attribute parameter indicates whether the first video image is shot by a front camera of the electronic device or a rear camera of the electronic device.

3. The audio processing method of claim 1, wherein the feature value further comprises a focal length range of the first camera.

4. The audio processing method of claim 1, wherein before recording the first audio, the audio processing method further comprises:
   capturing sound signals in all directions;
   obtaining, based on the sound signals, initial audio data;
   determining, based on the feature value, a first sound pickup range corresponding to the first display area; and
   further recording, based on the first sound pickup range and the initial audio data, the second audio.

5. The audio processing method of claim 4, wherein the first audio further comprises a fourth audio corresponding to the first video image.

6. The audio processing method of claim 1, wherein the first audio further comprises a fourth audio comprising a fifth audio for a first duration and a sixth audio for a second duration, wherein the fifth audio is the panoramic audio, wherein the sixth audio corresponds to a second zoom magnification of the first camera, and wherein the audio processing method further comprises:
   performing shooting using the first camera and using a third zoom magnification during the first duration; and
   performing shooting using the first camera and using the second zoom magnification during the second duration.

7. The audio processing method of claim 1, further comprising performing front/rear camera switching using a front/rear camera switching control of the first display area.

8. The audio processing method of claim 1, further comprising:
   detecting a second operation on a camera switching control of the first display area; and
   displaying, in the first display area and in response to the second operation, a third video image captured by a third camera of the electronic device, wherein the first camera is a rear wide-angle camera, and wherein the third camera is a rear long-focus camera.

9. The audio processing method of claim 1, further comprising:
   adjusting, using a first zoom adjustment control in the first display area, the first zoom magnification; and
   adjusting, using a second zoom adjustment control in the second display area, a second zoom magnification of the second camera.

10. The audio processing method of claim 1, further comprising:
    detecting, from the user for the first display area, a second zoom magnification;
    making a determination that the second zoom magnification exceeds a focal length range of the first camera;
    prompting, in response to the determination, the user to switch to a third camera; and
    displaying, in the first display area, a third video image captured by the third camera based on the second zoom magnification.

11. The audio processing method of claim 1, further comprising:
    detecting, from the user for the first display area, a second zoom magnification;
    making a determination that the second zoom magnification exceeds a first focal length range corresponding to the first display area and falls within a second focal length range corresponding to the second display area, wherein the first focal length range is different from the second focal length range;

prompting, in response to the determination, the user to perform a zoom operation on a zoom adjustment control of the second display area; and displaying, in the second display area, a third video image captured by the second camera based on the second zoom magnification.

12. An electronic device comprising:
a first camera configured to capture a first video image;
a second camera configured to capture a second video image; and
a processor coupled to the first camera and the second camera and configured to:
  detect, from a user, a first operation to open a camera application;
  display, in response to the first operation, a shooting preview interface;
  enter into a multi-channel video recording mode;
  detect a shooting operation of the user;
  display, in response to the shooting operation, a shooting interface comprising a first display area and a second display area, wherein the first display area displays the first video image, and wherein the second display area displays the second video image;
  simultaneously record, in the multi-channel video recording mode, the first video image using the first camera and the second video image using the second camera;
  record, in the multi-channel video recording mode, first audio of a plurality of sound channels, wherein the first audio comprises a panoramic audio and a third audio corresponding to the second video image;
  record, in the multi-channel video recording mode, a second audio corresponding to the first video image based on a feature value corresponding to the first display area,
wherein the feature value comprises a first zoom magnification of the first camera and a distance between the first camera and a frame of the electronic device, and wherein the first audio further comprises the second audio;
  recognize an object in the first or second video;
  recognize sound associated with the object; and
  suppress, from at least one of the first, second, or third audios, sound other than the sound associated with the object.

13. The electronic device of claim 12, wherein the feature value further comprises a front/rear attribute parameter corresponding to the first display area, and wherein the front/rear attribute parameter indicates whether the first video image is shot by a front camera or a rear camera.

14. The electronic device of claim 12, wherein the feature value further comprises a focal length range of the first camera.

15. The electronic device of claim 12, wherein the processor is further configured to:
  capture sound signals in all directions;
  obtain, based on the sound signals, initial audio data;
  determine, based on the feature value, a first sound pickup range corresponding to the first display area; and
  record, based on the first sound pickup range and the initial audio data, the first audio.

16. The electronic device of claim 15, wherein the first audio further comprises a fourth audio corresponding to the first video image.

17. The electronic device of claim 12, wherein the first audio further comprises a fourth audio comprising a fifth audio for a first duration and a sixth audio for a second duration, wherein the fifth audio is the panoramic audio, wherein the sixth audio corresponds to a second zoom magnification of the first camera, and wherein the processor is further configured to:
  perform shooting using the first camera and using a third zoom magnification during the first duration; and
  perform shooting using the first camera and using the second zoom magnification during the second duration.

18. The electronic device of claim 12, wherein the processor is further configured to perform front/rear camera switching using a front/rear camera switching control of the first display area.

19. The electronic device of claim 12, further comprising a third camera coupled to the processor and configured to capture a third video image, wherein the first display area comprises a camera switching control, and wherein the processor is further configured to:
  detect a second operation on the camera switching control; and
  display, in the first display area in response to the second operation, the third video, wherein the first camera is a rear wide-angle camera, and wherein the third camera is a rear long-focus camera.

20. A computer program product comprising computer-executable instructions that are stored on a non-transitory computer readable medium and that, when executed by a processor, cause an electronic device to:
  detect, from a user, a first operation to open a camera application;
  display, in response to the first operation, a shooting preview;
  enter into a multi-channel video recording mode;
  detect a shooting operation of the user;
  display, in response to the shooting operation, a shooting interface comprising a first display area and a second display area, wherein the first display area displays a first video image captured by a first camera of the electronic device, and wherein the second display area displays a second video image captured by a second camera of the electronic device;
  simultaneously record, in the multi-channel video recording mode, the first video image using the first camera and the second video image using the second camera;
  record, in the multi-channel video recording mode, first audio of a plurality of sound channels, wherein the first audio comprises a panoramic audio and a third audio corresponding to the second video image;
  record, in the multi-channel video recording mode, a second audio based on a feature value corresponding to the first display area, wherein the feature value comprises a zoom magnification of the first camera and a distance between the first camera and a frame of the electronic device;
  recognize an object in the first or second video;
  recognize sound associated with the object; and
  suppress, from at least one of the first, second, or third audios, sound other than the sound associated with the object.

* * * * *